(12) United States Patent
Malek et al.

(10) Patent No.: US 10,843,801 B2
(45) Date of Patent: Nov. 24, 2020

(54) AIRCRAFT INTERIOR CONFIGURATION

(71) Applicant: BOMBARDIER INC., Dorval (CA)

(72) Inventors: Bruce Malek, Sainte-Anne-de-Bellevue (CA); Louis Joseph Gagnon-Seguin, Montreal (CA); Bruno Miron, Les Cedres (CA); Philippe Andre Eugene Erhel, Montreal (CA); Tim Michael Fagan, Beaconsfield (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/376,740

(22) Filed: Apr. 5, 2019

(65) Prior Publication Data

US 2019/0233115 A1    Aug. 1, 2019

Related U.S. Application Data

(62) Division of application No. 13/878,855, filed as application No. PCT/US2010/052846 on Oct. 15, 2010, now Pat. No. 10,293,942.

(51) Int. Cl.
*B64D 11/06*    (2006.01)
*B64D 11/00*    (2006.01)

(52) U.S. Cl.
CPC .............. *B64D 11/06* (2013.01); *B64D 11/00* (2013.01); *B64D 11/0601* (2014.12); *B64D 11/0638* (2014.12)

(58) Field of Classification Search
CPC . B64D 11/06; B64D 11/0601; B64D 11/0638; B64D 11/00; B60N 2/242; B60N 2/3011; B60N 2/01; B60N 2/3043; B60N 2205/35; A47C 11/00

See application file for complete search history.

(56) References Cited

U.S. PATENT DOCUMENTS

| | | | | |
|---|---|---|---|---|
| 1,583,264 A | * | 5/1926 | Turner, Jr. | A47B 5/06 |
| | | | | 108/33 |
| 1,870,719 A | * | 8/1932 | Fain | A47B 83/045 |
| | | | | 108/40 |
| 1,998,186 A | * | 4/1935 | Caesar | B60N 2/3018 |
| | | | | 297/116 |
| 2,396,039 A | * | 3/1946 | Graves | B64D 11/00 |
| | | | | 244/118.1 |
| 3,594,037 A | | 7/1971 | Sherman | |

(Continued)

FOREIGN PATENT DOCUMENTS

| BE | 461203 | 12/1945 |
|---|---|---|
| EP | 0514650 | 11/1992 |

(Continued)

OTHER PUBLICATIONS

International Search Report dated Mar. 29, 2011, for International Patent Application No. PCT/US2010/052846.

(Continued)

*Primary Examiner* — Medhat Badawi
(74) *Attorney, Agent, or Firm* — Karceski IP Law, PLLC

(57) ABSTRACT

An interior configuration for an aircraft, comprising a bed positioned adjacent to one side of a fuselage on a floor of a cabin within the aircraft; and a movable table positioned in relation to the bed so that the movable table may be positioned over at least a portion of the bed.

5 Claims, 19 Drawing Sheets

(56) References Cited

U.S. PATENT DOCUMENTS

| | | | | |
|---|---|---|---|---|
| 3,955,847 | A * | 5/1976 | Schiowitz | B60P 7/0807 296/65.04 |
| 4,278,387 | A * | 7/1981 | Seguela | A61G 3/06 414/462 |
| 4,678,202 | A * | 7/1987 | Jensen | A61G 5/08 280/47.4 |
| 4,679,749 | A | 7/1987 | Ryan et al. | |
| 4,728,119 | A * | 3/1988 | Sigafoo | A61G 5/00 280/250.1 |
| 4,902,069 | A | 2/1990 | Lehnert | |
| 4,913,487 | A | 4/1990 | Breckel et al. | |
| 5,707,103 | A | 1/1998 | Balk | |
| 5,769,360 | A * | 6/1998 | Kerbis | B64D 11/06 244/118.6 |
| 5,947,416 | A * | 9/1999 | Kraft | A47B 1/00 108/143 |
| 6,000,659 | A * | 12/1999 | Brauer | B64D 11/00 244/118.5 |
| 6,059,364 | A * | 5/2000 | Dryburgh | A47C 1/0352 297/354.13 |
| 6,152,400 | A | 11/2000 | Sankrithi et al. | |
| 6,155,519 | A * | 12/2000 | Rajasingham | B64D 11/00 244/118.6 |
| 6,273,366 | B1 | 8/2001 | Sprenger et al. | |
| 6,474,599 | B1 | 11/2002 | Stomski | |
| 6,648,393 | B1 * | 11/2003 | Milnar | B60N 2/01583 296/65.11 |
| 6,696,979 | B2 | 2/2004 | Manten et al. | |
| 7,108,226 | B2 | 9/2006 | Quan et al. | |
| 7,399,031 | B2 * | 7/2008 | Gardner | B60P 3/39 297/1 |
| 7,578,551 | B2 * | 8/2009 | Linero | A47C 1/122 297/107 |
| 7,966,952 | B2 * | 6/2011 | Fissette | B64D 11/0007 108/115 |
| 8,096,502 | B2 * | 1/2012 | Bock | B64D 11/0604 244/118.6 |
| 8,152,101 | B2 | 4/2012 | Law | |
| 8,172,321 | B2 * | 5/2012 | Hankinson | B64D 11/00 244/118.6 |
| 8,485,470 | B2 * | 7/2013 | Hankinson | B64D 11/06 244/118.6 |
| 8,522,769 | B2 * | 9/2013 | Ducate, Jr. | A47J 37/0786 108/102 |
| 8,677,910 | B2 * | 3/2014 | Yu | A47B 5/06 108/134 |
| 9,545,999 | B2 * | 1/2017 | Henshaw | B64D 11/0601 |
| 10,023,315 | B2 * | 7/2018 | Kuyper | A47B 5/006 |
| D849,454 | S * | 5/2019 | Webb | D6/643 |
| 2004/0173723 | A1 | 9/2004 | Looker | B64C 1/20 248/346.02 |
| 2004/0232283 | A1 | 11/2004 | Ferry et al. | |
| 2005/0023413 | A1 | 2/2005 | Saint-Jalmes | |
| 2005/0087650 | A1 | 4/2005 | Quan et al. | |
| 2006/0058107 | A1 | 3/2006 | Dobertin et al. | |
| 2006/0225625 | A1 * | 10/2006 | Bazzell | B60N 3/002 108/42 |
| 2007/0102577 | A1 | 5/2007 | Saint-Jalmes et al. | |
| 2007/0102579 | A1 | 5/2007 | Krieglsteiner et al. | |
| 2007/0152100 | A1 | 7/2007 | Saint-Jalmes et al. | |
| 2007/0170310 | A1 * | 7/2007 | Bock | B64D 11/0604 244/118.5 |
| 2007/0295863 | A1 | 12/2007 | Thompson | |
| 2008/0088160 | A1 * | 4/2008 | Johnson | B64D 11/06 297/240 |
| 2008/0179458 | A1 * | 7/2008 | de Siqueira | B64D 11/00 244/118.6 |
| 2009/0021064 | A1 * | 1/2009 | Shao | B60N 2/01541 297/344.1 |
| 2009/0050740 | A1 * | 2/2009 | Saint-Jalmes | B60N 2/0232 244/118.6 |
| 2009/0146005 | A1 * | 6/2009 | Bettell | B64D 11/064 244/118.6 |
| 2009/0249982 | A1 * | 10/2009 | Palethorpe | A47B 5/00 108/44 |
| 2009/0261200 | A1 | 10/2009 | Saint-Jalmes et al. | |
| 2009/0302158 | A1 * | 12/2009 | Darbyshire | B64D 11/06 244/118.6 |
| 2010/0065683 | A1 * | 3/2010 | Darbyshire | B64D 11/06 244/118.6 |
| 2010/0181425 | A1 | 7/2010 | Guering et al. | |
| 2010/0301162 | A1 * | 12/2010 | Hankinson | B64D 11/06 244/118.6 |
| 2011/0114788 | A1 | 5/2011 | Mosler et al. | |
| 2011/0210204 | A1 * | 9/2011 | Collins | B64D 11/06 244/118.6 |
| 2011/0215199 | A1 * | 9/2011 | Lee | B61D 37/00 244/118.5 |
| 2011/0273849 | A1 | 11/2011 | Jaeger | |
| 2012/0041619 | A1 | 2/2012 | Rudduck et al. | |
| 2012/0104165 | A1 * | 5/2012 | Dobrusin | B64D 11/06 244/118.6 |
| 2012/0146372 | A1 * | 6/2012 | Ferry | B64D 11/06 297/232 |
| 2012/0298798 | A1 * | 11/2012 | Henshaw | B64D 11/06 244/118.6 |
| 2013/0206904 | A1 | 8/2013 | Gee et al. | |
| 2014/0339360 | A1 | 11/2014 | Moje et al. | |
| 2014/0339362 | A1 | 11/2014 | Moje et al. | |
| 2015/0210396 | A1 * | 7/2015 | Saint-Jalmes | B64D 11/0601 244/118.6 |

FOREIGN PATENT DOCUMENTS

| | | |
|---|---|---|
| WO | 2008033360 A2 | 3/2008 |
| WO | 2008122762 A1 | 10/2008 |

OTHER PUBLICATIONS

Canadian Office Action dated Sep. 28, 2016, for Canadian Patent Application No. 2,814,622.
Canadian Office Action dated Jul. 14, 2017, for Canadian Patent Application No. 2,814,622.
Canadian Office Action dated Apr. 19, 2018, for Canadian Patent Application No. 2,814,622.

* cited by examiner

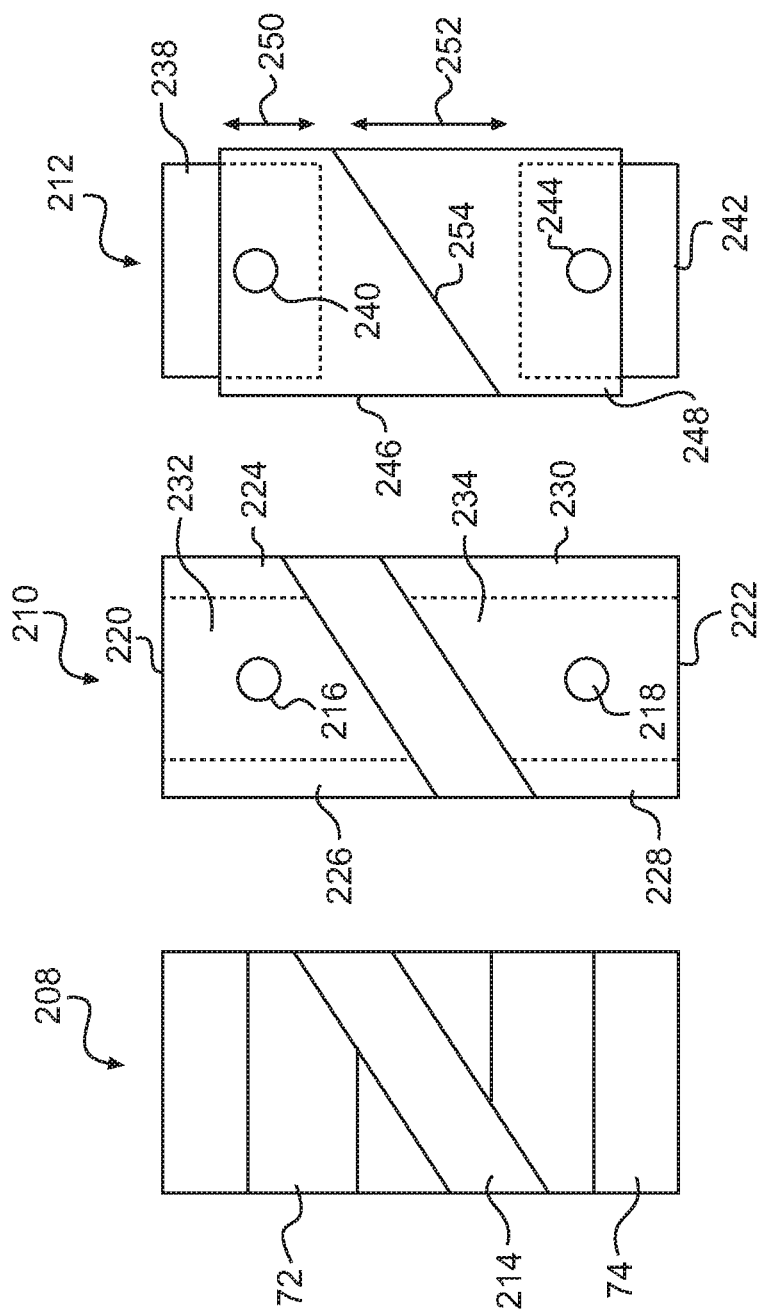

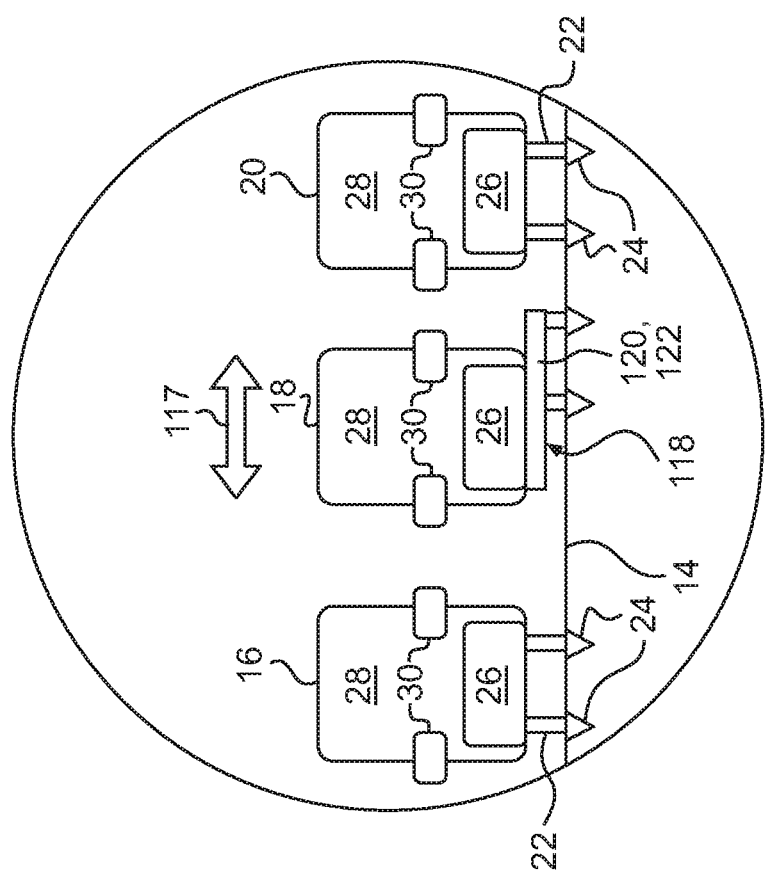

AIRCRAFT INTERIOR CONFIGURATION

CROSS-REFERENCE TO RELATED APPLICATION(S)

This is a U.S. Divisional Application of U.S. patent application Ser. No. 13/878,855, filed on Jun. 13, 2013, which is a National Stage Entry into the United States Patent and Trademark Office from International PCT Patent Application No. PCT/US2010/052846, having an international filing date of Oct. 15, 2010, the entire contents of all of which are incorporated herein by reference.

FIELD OF THE INVENTION

The present invention concerns configurations for the interior architecture of an aircraft, specifically, the layout of various elements within an aircraft.

DESCRIPTION OF RELATED ART

As should be apparent to those skilled in the art, the interior configurations for most aircraft are designed around a basic plan that maximizes the seating capacity of an aircraft.

In one known, typical configuration, the aircraft presents an interior where there is a central passageway with seating areas on either side of the passageway. The seats typically are configured such that they face the front of the aircraft and are positioned in a side-by-side arrangement, facing toward the front or fore section of the aircraft fuselage. This arrangement also may be referred to as straight passageway or straight aisle configuration.

In larger aircraft, such as commercial aircraft, there may be room for a second passageway. In these larger, commercial aircraft, manufacturers typically will follow the traditional approach. Specifically, the seats will face the front of the aircraft and will be disposed in a side-by-side arrangement.

In recent years, manufacturers have expressed a desire to depart from this traditional approach.

In one example, in U.S. Pat. No. 7,108,226 (hereinafter "the '226 patent"), which is assigned to the Boeing Company, an interior seating architecture for an aircraft is proposed where groups of seats are arranged in a booth-style configuration. With reference to FIG. 2 in the '226 patent, for example, pairs of seats 22, 24 are positioned in fore and aft positions, meaning that they face either the front or the rear of the aircraft. The pairs of seats 22, 24, therefore, permit face-to-face interaction by the occupants. A credenza or cabinet 30 and a table 40 also may be provided in this configuration.

It is noted that, even with the configuration presented in the '226 patent, the seating arrangement remains dependent upon the traditional passageway layout for an aircraft. Specifically, the seating arrangement is incorporated in the aircraft such that the booth remains disposed adjacent to an passageway.

In smaller aircraft employed for private use, whether personal or corporate, for example, there is less of a concern for maximized seating capacity. However, the smaller sizes of the aircraft present a challenge to interior designers because there is a smaller headroom capacity and reduced cabin width, which limits the configurations that may be reasonably employed.

SUMMARY OF THE INVENTION

The present invention addresses one or more of the issues identified above.

The present invention presents several interior configurations that are intended to provide enhanced functionality with respect to the interior layout of an aircraft.

The present invention departs, at least in pan, from the traditional, straight aisle-based approach to the seating arrangement within an aircraft.

The present invention provides for an interior configuration for an aircraft with a first passageway extending along a longitudinal axis of a fuselage of the aircraft, a second passageway extending along the longitudinal axis, and a transitional region disposed between the first passageway and the second passageway. The transitional region extends perpendicularly to the longitudinal axis, between first and second sides of the fuselage, the first and second sides being disposed on opposite sides of the longitudinal axis. The transitional region is configurable from at least a first configuration to at least a second configuration.

In one contemplated embodiment of the interior configuration, the first passageway and the second passageway are offset from one another in a lateral direction, perpendicular to the longitudinal axis. In addition, the transitional region defines at least a third passageway, disposed at an angle to the longitudinal axis, connecting the first passageway to the second passageway.

In another contemplated embodiment, the transitional region includes at least one stowage area disposed adjacent to at least one of the first and second sides of the fuselage. A stowable table is disposed within the at least one stowage area. The stowable table may be deployed to extend perpendicularly to the longitudinal axis into the transitional space to establish a conference table.

In yet another contemplated embodiment, the transitional region includes a first stowage area disposed adjacent to the first side of the fuselage, a second stowage area disposed adjacent to the second side of the fuselage, a first table stowable in the first stowage area, and a second table stowable in the second stowage area. Deployment of the first table establishes a first conference table in the transitional space. Deployment of the second table establishes a second conference table in the transitional space.

One embodiment of the present invention contemplates that the first table and the second table present angled ends that extend along the third passageway.

Another embodiment of the present invention contemplates that the transitional region includes a first stowage area disposed adjacent to the first side of the fuselage, a second stowage area disposed adjacent to the second side of the fuselage, a first table stowable in the first stowable area, and a second table stowable in the second stowable area. Deployment of the first table establishes a first conference table in the transitional space. Deployment of the second table establishes a second conference table in the transitional space. In addition, the first table and the second tables meet to form a continuous conference table extending from the first side to the second side of the fuselage, thereby obstructing the third passageway.

It is also contemplated that the transitional region includes a first group of three seats disposed perpendicularly to the longitudinal axis at a fore side of the transitional space, and a second group of three seats disposed perpendicularly to the longitudinal axis at an aft side of the transitional space. The first group of seats and the second group of seats face one another.

Yet another embodiment of the present invention contemplates that two of the three seats in the first group of seats are disposed next to one another adjacent to the first side of the fuselage and are separated by the first passageway from a third of the three seats. In this embodiment, two of the three seats in the second group of seats are disposed next to one another adjacent to the second side of the fuselage and are separated by the second passageway from a third of the three seats.

The present invention also contemplates that at least a center seat of the first and second groups of seats comprises a seat frame permitting the center seats to be shifted into the first and second passageways.

Moreover, the present invention presents embodiments where the two of the three seats in the first and second groups of seats are disposed together on a seat frame permitting at least a center seat of the three seats to be shifted into the first and second passageways.

It is also contemplated that the transitional region may include a first group of seats disposed perpendicularly to the longitudinal axis at a fore side of the transitional space, and a second group of seats disposed perpendicularly to the longitudinal axis at an aft side of the transitional space. If so, the first group of seats and the second group of seats may face one another.

The present invention also provides for embodiments where the first group of seats includes a first subset of A seats and a second subset of B seats, with A being less than B, the second group of seats includes a first subset of C seats and a second subset of D seats, with C being less than D, the first subset of A seats are disposed adjacent to the first side of the fuselage and are separated by the first passageway from the second subset of B seats, and the first subset of C seats are disposed adjacent to the second side of the fuselage and are separated by the second passageway from the second subset of D seats.

Concerning the previous embodiment, it is contemplated that at least one seat adjacent to the first and second passageways includes a seat frame permitting the at least one seat to be shifted into the first and second passageways.

The present invention also provides for configurations where any of the subsets of seats are disposed together on a seat frame permitting at least one seat to be shifted into the first and second passageways.

In still one further embodiment, the present invention contemplates an aircraft interior with a bed positioned adjacent to one side of a fuselage on a floor of a cabin within the aircraft, and a movable table positioned in relation to the bed so that the movable table may be positioned over at least a portion of the bed.

With respect to this embodiment, it is contemplated that the movable table may be slidably disposed within the aircraft cabin to extend over the bed.

It is also contemplated that a ledge may be disposed between the bed and the one side of the fuselage of the aircraft. The movable table may be supported, at a first end, by the ledge. If so, the movable table may be supported at a second end by the floor. The movable table may be L-shaped in at least one embodiment of the present invention.

It is also contemplated that the aircraft interior may present at least one cabinet positioned adjacent to one side of the bed. If so, the movable table may slide to extend over the cabinet and, thereby, not extend over any portion of the bed.

Those skilled in the art will appreciate other aspects of the invention based on the discussion that follows and the drawings appended hereto.

BRIEF DESCRIPTION OF THE DRAWINGS

The invention will now be described in connection with the drawings, in which:

FIG. 6 is a top view of a second embodiment of a conference table contemplated by the present invention;

FIG. 7 is a top view of a third embodiment of a conference table contemplated by the present invention;

FIG. 8 is a top view of a fourth embodiment of a conference table contemplated by the present invention;

FIG. 9 is a cross-sectional view of the fuselage of the aircraft of the present invention, showing a first configuration for the seats that are movable in a lateral direction of the fuselage;

DETAILED DESCRIPTION OF EMBODIMENT(S) OF THE INVENTION

The description of the invention set forth below focuses on one or more embodiments of the invention. The embodiments are intended to be exemplary of the invention and not limiting of the scope of the invention. As should be apparent to those skilled in the art, the embodiments described herein present aspects of the invention for which there are numerous variations and equivalents. Those variations and equivalents are intended to be encompassed by the present invention.

As a preliminary matter, it is noted that cross-reference is made herein to one or more of the drawings. Reference to one or more other figures in connection with the discussion of a particular feature is not intended to exclude reference to other figures. In other words, while reference may be made to one or more illustrations, other drawings also may be relevant to the discussion.

Figure 1:
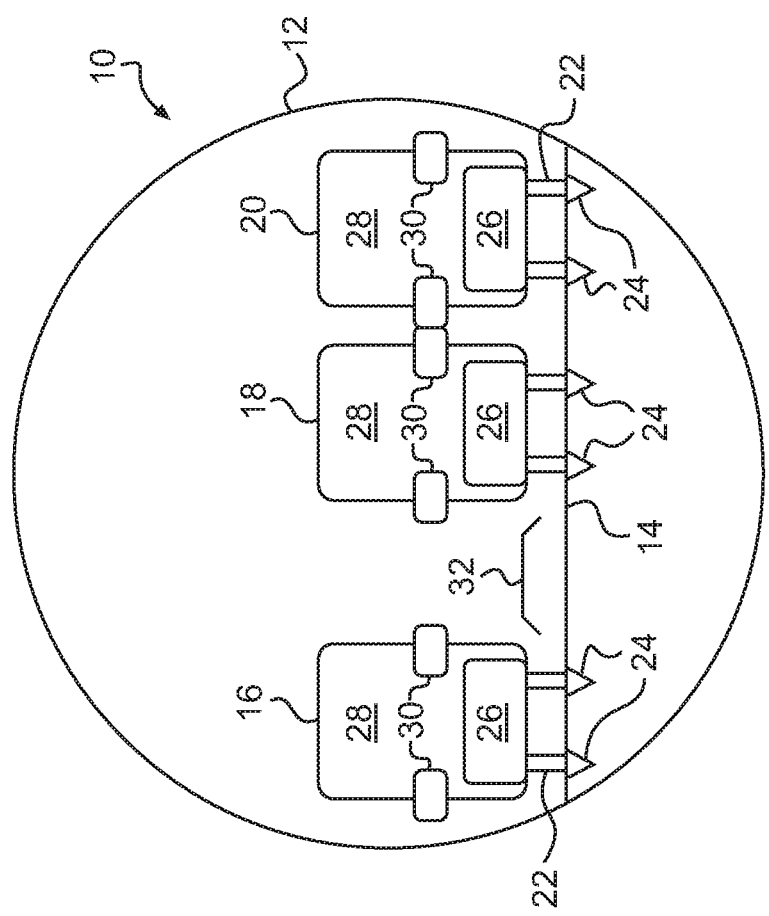
FIG. 1 is a cross-sectional illustration of a fuselage for an aircraft, the cross-section being taken along line I-I in FIG. 3.
Figure 3:
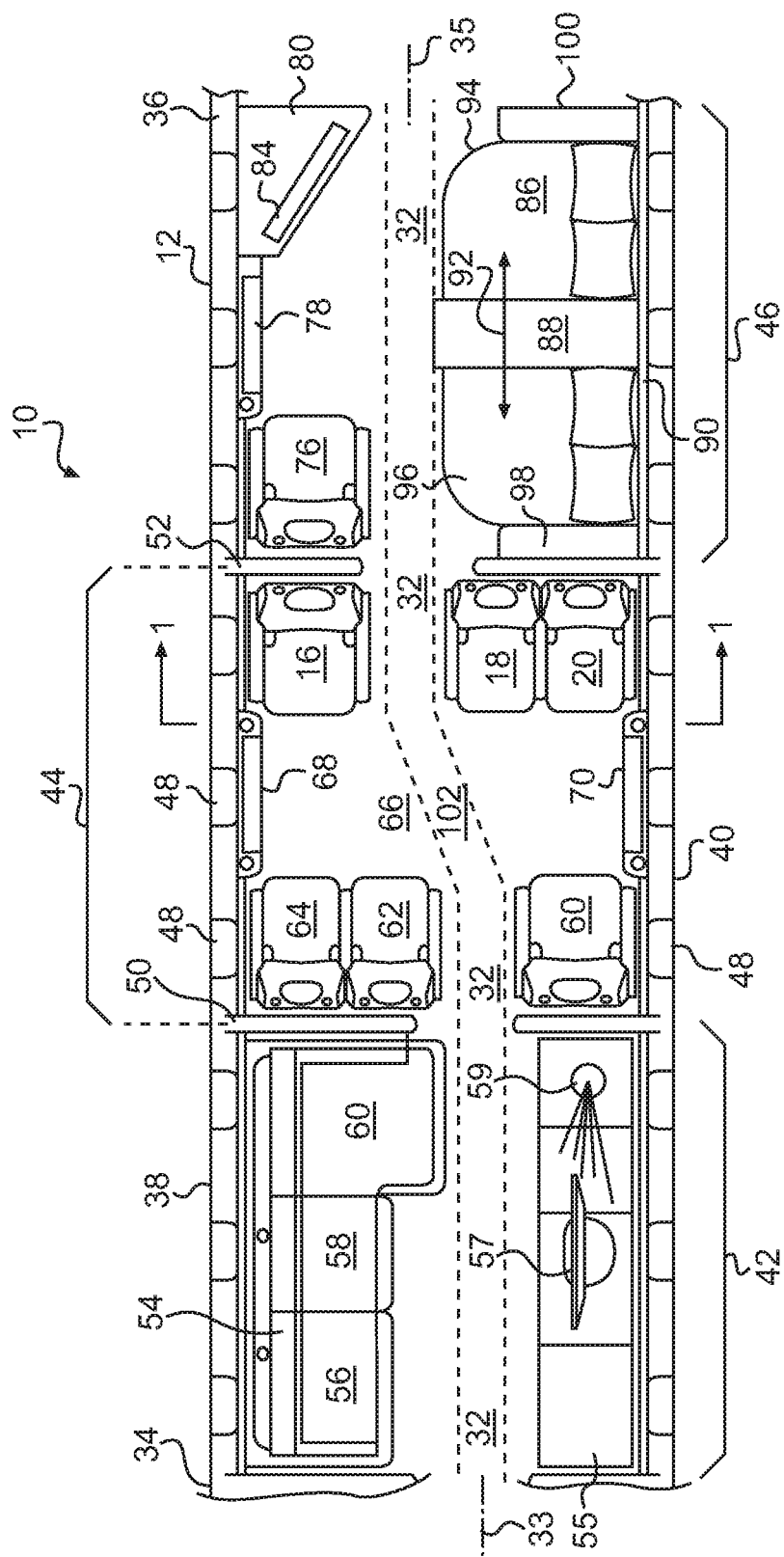
FIG. 3 is a top plan view of a first embodiment of a configuration for an aircraft interior that is contemplated by the present invention.

FIG. 1 is a cross-sectional illustration of an aircraft fuselage 10, which is taken along line I-I in FIG. 3. FIG. 1 provides a cross-section of the fuselage 10 that is consistent with the first embodiment of the present invention. The cross-section also is applicable to other embodiments, as discussed below.

While a circular cross-section has been selected for the fuselage 10 depicted in FIG. 1, it is noted that the cross-sectional shape of the fuselage 10 is not critical to operation any embodiment of the present invention. It is contemplated, for example, that the fuselage 10 alternatively may present a square or oval configuration, among others. In other words, the fuselage 10 may take any shape without departing from the scope of the present invention. For ease of illustration, a circular cross-section for the fuselage 10 has been selected for the various embodiments of the invention that are depicted herein.

Additionally, it is noted that the size of the fuselage 10 is not critical to the operation of the present invention. The fuselage 10 may be proportionately larger or smaller depending upon type of aircraft. In addition, the seats 16, 18, 20 in the aircraft may be larger or smaller depending upon the size and style of the aircraft. As should be apparent, therefore, the relative proportions of the various elements of the aircraft (with respect to one another) may be altered without departing from the scope of the present invention.

As illustrated in FIG. 1, the fuselage 10 includes an exterior shell or body 12, typically constructed from aluminum or an alloy thereof. As may be appreciated, an aircraft may be made from any suitable material, including carbon composites or the like. The material from which the fuselage 10 is made is not critical to the present invention.

As illustrated in FIG. 1, the fuselage 10 includes a floor 14 positioned within the body 12. Seats 16, 18, 20 for passengers are positioned on the floor 14.

As should be known to those skilled in the art, the seats 16, 18, 20 typically include legs 22 that are secured in tracks 24 that are incorporated into the floor 14. The tracks 24 permit the seats 16, 18, 20 to be moved in a direction fore and aft of the fuselage 10. For safety reasons, the seats 16, 18, 20 typically cannot be moved from their secure positions within the tracks 24 without proper tools and equipment. In other words, passengers usually are not able to move any of the seats 16, 18, 20 within the tracks 24 under normal operating conditions.

Concerning the tracks 24 and the seats 16, 18, 20, it is known to the art to construct seats 16, 18, 20 that may be moved a limited (or predetermined) distance within the tracks 24, in either or both of the fore and aft directions. Seats 16, 28, 20 capable of being moved within the tracks 24 are referred to herein as adjustable seats. Adjustable seats typically are provided with a lever that permits the limited (or predetermined) movement of the seats 16, 18, 20 in fore and aft directions. Adjustable seats 16, 18, 20 may be made available for corporate and private aircraft.

For purposes of the present invention, adjustable seats 16, 18, 20 (that may move in the fore and aft directions via operation of a lever or other operating mechanism) may be employed without departing from the scope of the present invention. Adjustment of the seats 16, 18, 20 may be employed in lieu of or in addition to the adjustability parameters that are discussed in greater detail below.

As illustrated, the seats 16, 18, 20 include seat cushions 26, back rests 28, and one or more arms 30, which may be stowable. These aspects of the seats 16, 18, 20 are provided merely for context, as the exact construction of the individual seats 16, 18, 20 is not critical to the present invention. The seats 16, 18, 20 (and any of the other seats described herein) may take any other form, shape, design, or construction without departing from the scope of the present invention.

As illustrated in FIGS. 1, 2, 6, and 7, each of the seats 16, 28, 20 is provided with two armrests 30. It is possible, however, that the seats 18, 20 may share a common armrest 30 without departing from the scope of the present invention. Other configurations may be known to those skilled in the art and are intended to be encompassed by the present invention.

As also illustrated in FIG. 1, a passageway 32 is defined between the seats 16 and 18. The passageway 32 defines an aisle or walkway for passengers to transit from one section of the aircraft to another, as discussed in greater detail below.

Figure 2:
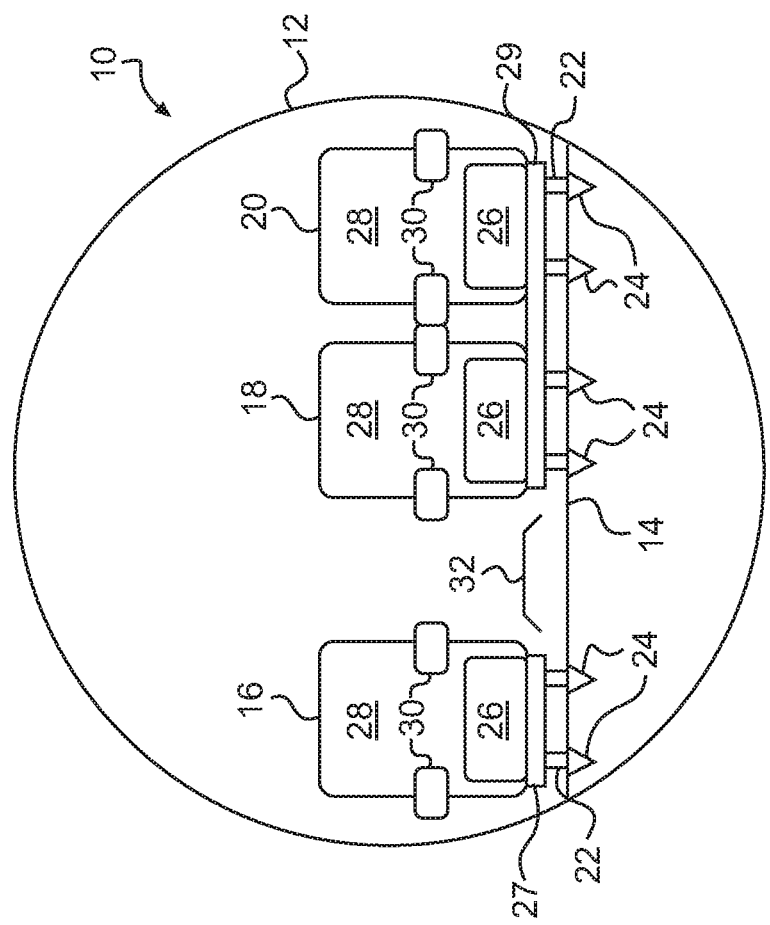
FIG. 2 is a cross-sectional illustration of an alternative to the embodiment illustrated in FIG. 1, showing how the right-hand most seats are not independent from one another, but instead are mounted on the same frame.

FIG. 2 presents a variation of the configuration depicted in FIG. 1. In FIG. 2, the seat 16 includes a seat base 27 that is affixed atop the legs 22 associated with the seat 16. The seat base 27 supports the seat 16 and may permit the seat 16 to be adjusted with respect thereto. Specifically the seat base 27 may permit the seat 16 to move in fore and aft directions, port and starboard directions, or rotationally.

The seats 18, 20 also are supported on a seat base 29. Here, the seats 18, 20 share a common seat base 29 that is supported on two legs 22 (or pairs of legs). The seat base 29 also permits adjustment of the seats 18, 20, thereto. Specifically, the seat base 29 may permits the seats 18, 20 to be moved in fore and aft directions, port and starboard directions, or rotationally. Further aspects of the seat bases 27, 29 are discussed in greater detail below, It is noted that the two configurations presented in FIGS. 1 and 2 are provided to illustrate two different approaches that interior designers may take when selecting a particular configuration for an aircraft. These approaches are not intended to be limiting of the present invention.

The approach depicted in FIG. 1 requires two tracks 24 more than the embodiment illustrated in FIG. 2. The additional tracks 24 provide additional points of attachment for various components to the floor 14. Therefore, when a greater number of attachment points are needed, among other reasons, the embodiment illustrated in FIG. 1 may be selected.

As should be apparent to those skilled in the art, however, it is usually preferred to have fewer components on an aircraft so that the overall weight of the aircraft is reduced as much as possible. Accordingly, it is preferred in most instances to eliminate two of the tracks 24, as provided in FIG. 2. In this configuration, the seats 18, 20 form a banquette that rests on two legs 22 (or pairs of legs) that are attached to the floor 14. By this configuration, therefore, two tracks 24 may be eliminated and, as a result, the overall weight of the aircraft is reduced.

FIG. 3 is a top plan view of a first embodiment of a seating configuration contemplated by the present invention. FIG. 3 illustrates a portion of the fuselage 10.

In FIG. 3, the front (or fore) section 34 of the fuselage 10 is to the left of the drawing. As a result, the rear (or aft) section 36 of the fuselage 10 is on the right-hand side of the drawing. With this orientation, the right (or starboard) side 38 of the aircraft is at the top of the drawing. The left (or port) side 40 of the aircraft is at the bottom of the drawing. As should be apparent, the fore and aft (and, therefore, the port and starboard) directions may be reversed without departing from the scope of the present invention. It is also contemplated that the layout of the interior of the aircraft may be reversed, as a mirror image, taken through the centerline of the fuselage 10 without departing from the scope of the present invention.

In FIG. 3, the interior of the fuselage 10 is divided into three compartments, a first compartment 42, a second compartment 44, and a third compartment 46. For reference, each of the compartments 42, 44, 46 includes a plurality of windows 48, which is typical in aircraft construction. The windows may be selected from any type, size, construction, or design, and in any number as may be appropriate for the aircraft without departing from the scope of the present invention.

As noted above, it is contemplated that the seating configuration in any of the compartments 42, 44, 46 may be reversed about the centerline of the fuselage 10. In other words, taking the seating arrangement in the second compartment 44 as an example of this variation, it is contemplated that the seat 16 could be positioned against the port side 40 of the fuselage 10 and the seats 18, 20 could be positioned against the starboard side 38 of the fuselage 10. To maintain the relative positions of the seats 16, 28, 20, 60, 62, 64 with respect to one another, the seat 60 would be positioned against the starboard side 38 of the fuselage 10, while the seats 62, 64 would be moved against the port side 40.

Returning to FIG. 3, the first, second, and third compartments 42, 44, 46 do not form a continuous space within the interior of the fuselage 10. Instead, the first compartment 42 is separated from the second compartment 44 by a first bulkhead 50. The second compartment 44, in turn, is separated from the third compartment 46 by a second bulkhead 52.

It is noted that the bulkheads 50, 52 are not required to practice the present invention, as discussed in greater detail with respect to FIGS. 11 and 20, below. Accordingly, it is noted that the interior configuration illustrated in FIG. 3 may be employed without the separating bulkheads 50, 52.

The first compartment 42 defines a general seating area. In the first compartment 42, there is a couch 54 defining a three-part seating area. The first and second parts 56, 58 of the couch 54 are of equal depth, as measured from the exterior skin of the body 12. The third part 60 of the couch 54 extends further toward the passageway 32 than do the first and second parts 56, 58, thereby establishing an L-shaped configuration for the couch 54.

A cabinet 55 sits across the passageway 32 from the couch 54. In the illustrated embodiment, the cabinet 55 has a television 57 and a decorative object 59 placed thereon. As should be apparent, the television 57 and the decorative object 59 are provided merely for context. Any other type of furniture and/or convenience items may be placed in the first compartment 42 (or any of the other compartments) without departing from the scope of the present invention.

The second compartment 44 includes six seats. To the right (i.e., to the aft side) of the second compartment 44 are the seats 16, 18, 20. At the fore side 34 of the second compartment 44 are three additional seats 60, 62, 64. As should be apparent from the illustration, the seats 16, 18, 20, 60, 62, 64 are identical to one another except for their positional relationships within the second compartment 44. It is noted that each of the seats 16, 18, 20, 60, 62, 64 is provided with unique identifying reference numerals to facilitate the discussion of the present invention.

The seats 16, 18, 20, 60, 62, 64 may be identical in their construction and appearance or they may differ from one another. For example, it is contemplated that the seats could differ from one another in size, shape, and/or design, as might be selected for a particular interior. In other words, the seats 16, 18, 20, 60, 62, 64 do not need to have the same appearance and/or construction to fall within the scope of the present invention.

As shown in FIG. 3, the seat 16 sits alone, against the starboard side 38 of the fuselage 10. The seat 18 sits roughly in the middle of the second compartment 44, along a line laterally oriented with respect to the seat 16 and the seat 20. The seat 18 is immediately adjacent to the seat 20. The passageway 32 separates the seat 16 from the seat 18, as also shown in FIG. 1.

Since the seats 60, 62, 64 face the seats 16, 18, 20, they present a reversed mirror image of the seats 16, 18, 20. As shown, therefore, the seat 60 sits alone against the port side 40 of the fuselage 10. The seat 62 is roughly in the center of the second compartment 44, adjacent to the seat 64, which abuts against the starboard side 38 of the fuselage 10. The seat 60 is separated from the seat 62 by the passageway 32.

In FIG. 3, the passageway 32 is designated by an area surrounded by dotted lines. As should be apparent, the passageway 32 presents a walkway or aisle extending from the front 34 to the rear 36 of the fuselage 10. The passageway 32 facilitates transit of passengers from the fore section 34 to the aft section 36 of the fuselage 10. While the passageway 32 is designated generally by the dotted lines for ease of reference, it is noted that the size of the passageway is not limited proportionately to the dotted lines provided. In other words, the passageway 32 may be proportionately larger or smaller as required or desired.

Figure 4:
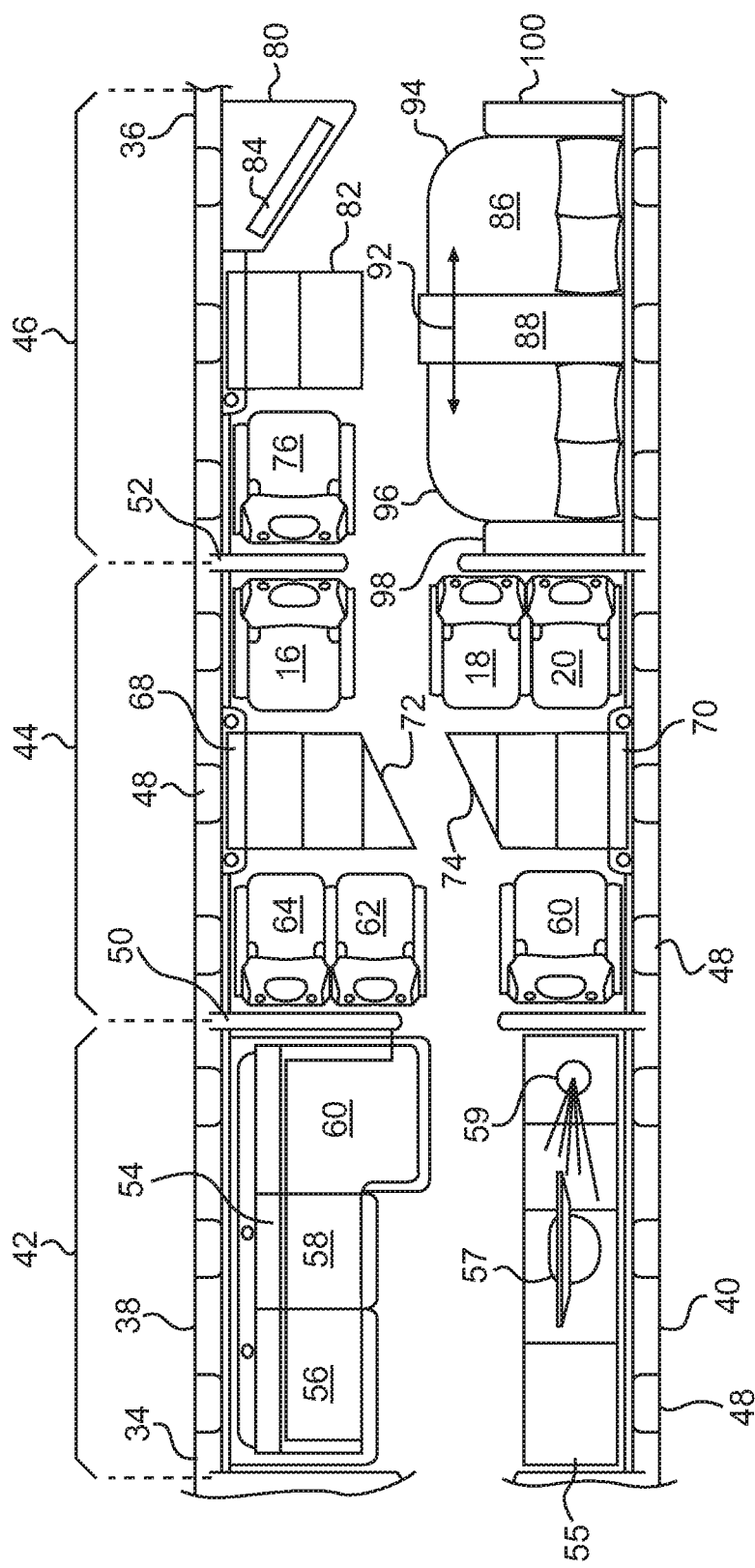
FIG. 4 is a top plan view of a second embodiment of a configuration for an aircraft interior that is contemplated by the present invention.

The second compartment 44 defines an open central area 66. Flanking the open area 66, at the starboard side 38 and the port side 40 of the fuselage 10 are cabinets/stowage areas 68, 70. The cabinets 68, 70 each stow retractable table tops 72, 74. The table tops 72, 74 are illustrated in FIG. 4 in an extended position. As it is apparent from the drawings, the table top 72 is associated with the cabinet 68 on the starboard side 38 of the aircraft. In turn, the table top 74 is associated with the cabinet 70 on the port side 40 of the fuselage 10.

In connection with the table tops 72, 74, it is noted that these components also may be considered as tables for purposes of the present invention. The term "table top" has been selected since the table tops 72, 74 do not include downwardly extending legs in this embodiment. The term "table top," however, is not intended to be limiting of the present invention, as should be apparent to those skilled in the art. With reference to the remainder of the instant disclosure, the terms "table tops" and "tables" are used interchangeably and are intended to encompass any table, portion or a table, or similar component, as should be apparent to those skilled in the art.

As with other features and aspects of the fuselage 10, it is noted that the cabinets 68, 70 and the table tops 72, 74 may be altered in their proportionate sizes with respect to other features and aspects of the present invention. In other words, the present invention is not limited to the proportionate sizes depicted for the cabinets 68, 70 and the table tops 72, 74 in FIGS. 3 and 4, among other figures.

The third compartment 46 of the aircraft is set up as a bedroom or private area within the aircraft. On the starboard side 38 of the third compartment 46, there is a seat 76, a cabinet 78, and television credenza 80. The seat 76 is like the seats 16, 18, 20, 60, 62, 64 in its construction, at least for purposes of this embodiment. The cabinet 78 is similar to the cabinets 68, 70 in that is stores a table top 82, as illustrated in FIG. 4. A television 84 is shown atop the television credenza 80.

As should be apparent, the television credenza 80 may be replaced with any other type of cabinet without departing from the scope of the present invention. Moreover, the television 80 may be excluded from the third compartment 46 without departing from the scope of the present invention. It is contemplated, for example, that the cabinet 80 might be replaced by another seat, like the seat 76. As should be appreciated by those skilled in the art, there are numerous variations that may be employed in the third compartment 46. Each of those variations is intended to be encompassed by the present invention.

On the port side 40 of the fuselage 10, the third compartment 46 includes a bed 86 with a movable table 88. The movable table top 88 is essentially an L-shaped component. At the end toward the passageway 32, the movable table top 88 rests on the floor 14. This end of the table 88 may be secured within a track within the floor 14. Alternatively, this end of the table 88 may be provide with one or more casters that permit the table top 88 to slide in fore and aft directions within the fuselage 10. At the other end, the movable table top 88 is secured to or rests on a ledge 90. So configured, the movable table top 88 may be moved in the directions of the arrows 92, fore and aft of the fuselage 10.

It is noted that the L-shape of the table 88 is not required to practice the present invention. The L-shape has been selected for the embodiment of the table 88 illustrated and discussed with respect to the present invention. As should be apparent to those skilled in the art, other configurations for the table 88 may be employed without departing from the scope of the present invention.

It is also noted that one embodiment of the table 88 may include casters. Of course, any other mechanism may be employed to permit the table 88 to move relative to the bed 86. The discussion of casters, therefore, is not intended to be limiting of the present invention.

With respect to the table 88, it is contemplated that the table 88 will be secured at least to the ledge 90 for ease of motion. This securement, however, is not intended to be limiting of the present invention but merely provided as one contemplated mode for operation of the table 88. Other modes of operation may be employed without departing from the scope of the present invention, as should be apparent to those skilled in the art.

It is contemplated, for example, that the moveable table top 88, may be secured movably in the ledge 90 at one end and may be secured in a track provided in a frame of the bed 86. Still other variations may be employed without departing from the scope of the present invention.

As illustrated in FIGS. 3 and 4, the movable table top 88 essentially divides the bed 86 into a first half 94 and a second half 96. Of course, since the movable table top 88 may be shifted fore or aft of the illustrated position, the movable table top 88 may be move so that the entirety of the bed 86 is not partitioned thereby, or is partitioned in any intermediary position.

It is noted that, while the bed 86 is contemplated to be a sleep area, the bed 86 also may be constructed to function as a suitable seating area. In other words, the designation of the bed 86 as a "bed" should not be understood to limit the function thereof for purposes of the present invention.

As also illustrated in FIGS. 3 and 4, a first night stand 98 and a second night stand 100 are positioned on either side of the bed 86. At least one of the night stands 98, 100 is sufficiently low in height that the movable table top 88 may be moved thereover so that the movable table top 88 does not occlude any portion of the bed 86. As may be appreciated, both night stands 98, 100 may be of a sufficient height so that the movable table top 88 may be moved into a position over either of the night stands 98, 100, as desired or required.

With respect to the night stands 98, 100, it is noted that these components may be considered or crafted as cabinets. The term "night stand" has been selected merely because the cabinets 98, 100 are at either side of the bed 86. As should be appreciated by those skilled in the art, the term "night stand" is not intended to be limiting of the present invention.

As may be appreciated from FIG. 3, the second compartment 44 presents a transitional area 102 in the central space 66. The transitional area 102 is transitional in several respects. First, the transitional area or region 102 presents a transition for the passageway 32 from a first longitudinal axis 33 to a second longitudinal axis 35 within the fuselage 10. Second, the transitional area 102 may be reconfigured in several different ways to accommodate different purposes.

For purposes of the present invention, the relative locations of the first and second longitudinal axes 33, 35 (which are designated in FIG. 3) are intended to be relative only. Depending upon the size and configuration of the fuselage 10, the relative locations of the longitudinal axes 33, 35 are contemplated to change. In other words, the longitudinal axes 33, 35 may be altered in from their depicted positions within the fuselage 10 without departing from the scope of the present invention.

With respect to the passageway 32, the transitional area 102 permits the passageway 32 to transition from a location near to the port side 40 of the fuselage 10 to a location near to the starboard side 38 of the fuselage 10. This transition is illustrated best in FIG. 3, where the dotted lines defining the passageway 32 are shown in a diagonal, thereby emphasizing the change in the lateral location of the passageway from the first compartment 42 to the rear compartment 46 of the fuselage 10.

With respect to the central area or space 66, this presents the second transitional aspect of the configuration for the second compartment 44. A comparison between FIGS. 3 and 4 is helpful to appreciate the transitional nature of the central space 66.

FIG. 3 illustrates the central space 66 when the table tops 72, 74 are stowed in the cabinets 68, 70, respectively.

The term "cabinets" has been selected merely to designate the locations where the table tops 72, 74 are stowed. The cabinets 68, 70 may be compartments that conceal the table tops 72, 74 when in the stowed condition. It is possible, however, that all or part of the table tops 72, 74 may be visible when stowed. In the case where the table tops 72, 74 are partially or wholly visible when in the stowed condition, the term "cabinet" is intended to refer to the stowage location rather than a compartment into which the table tops 72, 74 are placed. In other words, the term "cabinet" should not be understood to require a complete concealment of the table tops 72, 74. Since the cabinets 68, 70 may represent areas where the table tops 72, 74 may be stowed but remain partially or wholly visible, they are also referred to as stowage areas 68, 70 for purposes of the present invention. With respect to other cabinets described in connection with the present invention, the same caution applies, as should be apparent to those skilled in the art.

FIG. 4 shows the table tops 72, 74 in their unstowed positions. As such, the transitional area 102 may be transitioned from an open seating area to a seating area with two (or more) tables 72, 74. In the illustrated embodiment, each of the tables 72, 74 presents a work space for three of the occupants of the second compartment 44 that are immediately adjacent to the closest of the table tops 72, 74.

With respect to the table tops 72, 74, it is contemplated that these table tops 72, 74 will be at a conference table height (or meeting table height), rather than a coffee table height. In other words, it is contemplated that the table tops 72, 74 will be sufficiently tall (as measured from the floor 14) so that they present a suitable surface for conducting a meeting. Alternatively, one or both of the table tops 72, 74 could be at a lower height, which would be more akin to a coffee table height. In still one further contemplated embodiment, the table tops 72, 74 may be adjustable in height between a coffee table height and a meeting table height, as desired by the passengers.

Figure 5:
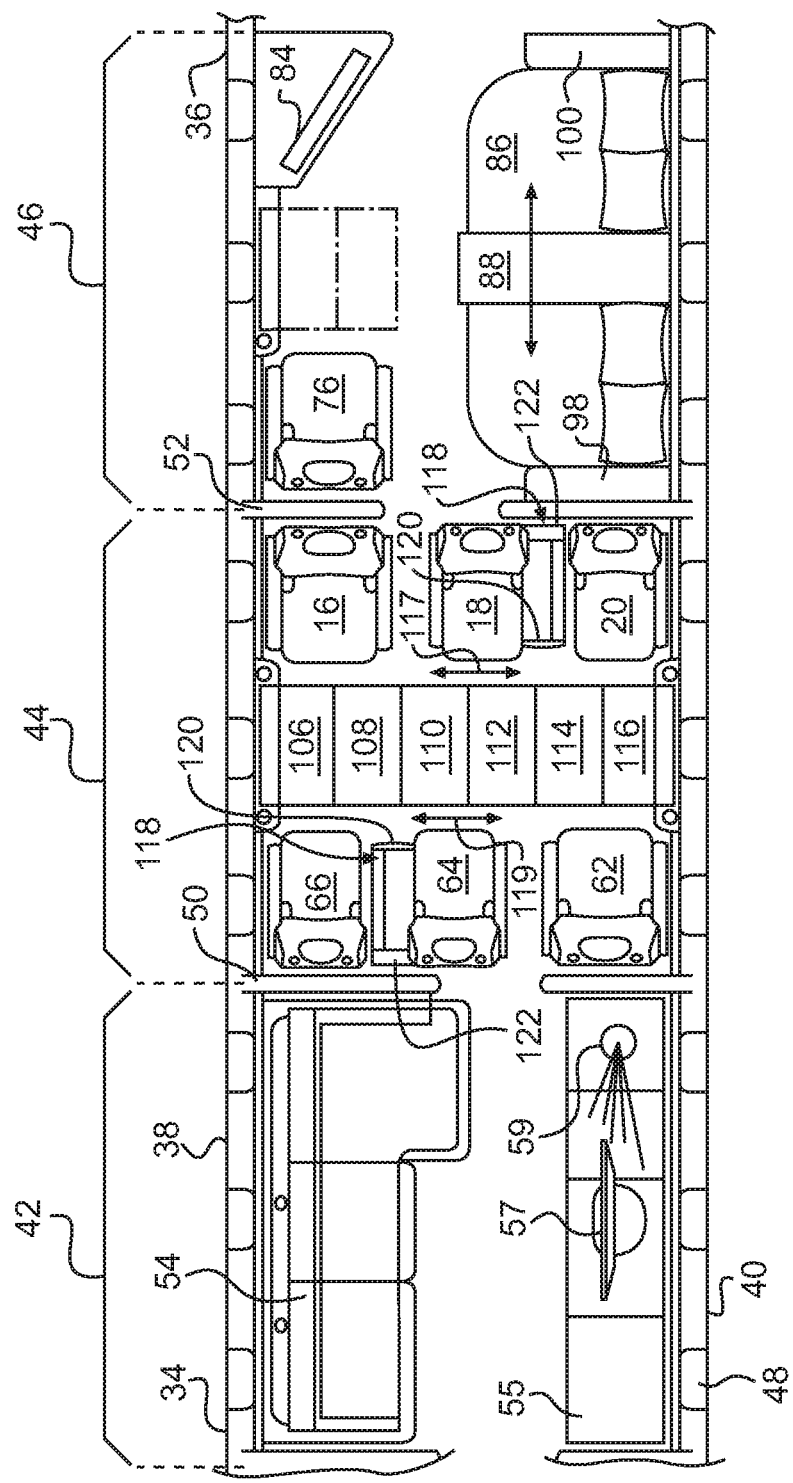
FIG. 5 is a top plan view of a third embodiment of a configuration for an aircraft interior that is contemplated by the present invention, illustrating a first embodiment of a conference table contemplated by the present invention.

FIG. 5 presents a further embodiment of the present invention. Here, the transitional space 102 may be transformed from an open, central area 66 to a conference table 104.

In this embodiment, the conference table 104 is illustrated with six connected segments 106, 108, 110, 112, 114, 116. Three of the connected segments 106, 108, 110 are stowed in the cabinet 68. The remaining three segments 12, 114, 116 are stowed in the cabinet 70. The segments 106, 108, 110, 112, 114, 116 are engineered to meet at the center of the central area 66 to establish the conference table 104 that extends continuously from the starboard side 38 to the port side 40 of the fuselage 10.

It is noted that the conference table 104 need not be stowed in the manner described above. It is possible that all six segments 106, 108, 110, 112, 114, 116 of the conference table 104 may be stored in one of the two cabinets 68, 70. Alternatively, the segments 106, 108, 110, 112, 114, 116 may not be divided equally between the cabinets 68, 70. For example, two of the segments 106, 108 may be stowed in the cabinet 68 while the remaining four segments 110, 112, 114, 116 are stowed in the cabinet 70. As should be apparent to those skilled in the art, still further variations are possible without departing from the scope of the present invention.

In addition, it is noted that the conference table 104 need not be constructed from six segments 106, 108, 110, 112, 114, 116. To the contrary, a larger or a fewer number of segments may be employed without departing from the present invention.

While not illustrated in FIG. 5, it is contemplated that the conference table may include one or more vertical supports that extend from the bottom of the conference table 104 and rest against the floor 14. This is contemplated to be useful to provide additional support for the conference table 104, as should be appreciated by those skilled in the art. Other types and constructions for supports also may be employed for the conference table 104 without departing from the present invention.

The embodiment illustrated in FIG. 5 differs from the embodiment illustrated in FIG. 4 in at least two respects. First, unlike the example of two tables 72, 74, which is illustrated in FIG. 4, the conference table 104 blocks the passageway 32 completely. Second, the seats 18, 62 are movable in port/starboard directions consistent with the arrows 117, 119. In other words, the center seats 18, 62 may be shifted from their initial positions, as illustrated in FIG. 4, to more central positions within the fuselage 10, as illustrated in FIG. 5. This shifting of the seats 18, 62 is a further feature of the transitional area 102.

As should be apparent from the drawings, the shifting of the seats 18, 62 into the passageway 32 permits a more comfortable arrangement of the seats 16, 18, 20, 60, 62, 64 around the conference table 104. In other words, with the shifting of the seats 18, 62 into the positions illustrated in FIG. 5, the conferees at the conference table are more comfortably disposed around the conference table 104.

FIGS. 6-8 illustrate three embodiments of conference tables 208, 210, 212 that are contemplated by the present invention. The conference tables 208, 210, 212 may be substituted for the conference table 104 described above. Alternatively, portions of the various embodiments may be combined interchangeably, in fashions not illustrated, without departing from the scope of the present invention.

As illustrated in FIG. 6, the second embodiment of the conference table 208 is intended to present a variation of the table tops 72, 74 that are illustrated in FIG. 4. In this embodiment, the table tops 72, 74 are connected to one another via an insert or leaf 214.

As should be apparent from FIG. 6, to create the conference table 208, the table tops 72, 74 are first unfolded from their respective cabinets 68, 70. Subsequently, the insert or leaf 214 is positioned between the ends of the table tops 72, 74, thereby establishing a continuous conference table 208 that extends from one side of the fuselage 10 to the other.

FIG. 7 illustrates a third embodiment of a conference table 210. In this illustration, the conference table 210 includes three sections that are supported by two pedestal legs 216, 218. Specifically, the pedestal leg 216 supports a first trapezoidal table top 220. The pedestal leg 218 supports a second trapezoidal table top 222. The first and second trapezoidal table tops 220, 222 are not intended to be stowed. Instead, the table tops 220, 222 are permanently deployed. As should be apparent, the table tops 220, 222 are intended to be placed in the central area 66 of the second compartment 44, between the seats 16, 18, 20, 60, 62, 64.

So that the table tops 220, 222 do not interfere with a passenger's ability to access one of the seats 16, 18, 20, 60, 62, 64 adjacent thereto, the trapezoidal table tops 220, 222 are provided with collapsible sections 224, 226, 228, 230.

As illustrated in FIG. 7, the trapezoidal table top 220 includes a central section 232 that is supported on the pedestal leg 216. On one side of the table top 220, a first collapsible section 224 is provided. On the opposite side of the table top 220, a second collapsible section 226 is provided. Like table top 220, table top 222 includes a central section 234 that is affixed atop the pedestal leg 218, which is affixed to the floor 14. The table top 222 has a collapsible section 228 at one end. A collapsible section 230 also is provided at the opposite side of the table top 222.

The collapsible sections 224, 226, 228, 230 are intended to be retractable. In one contemplated embodiment, the sections 224, 226, 228, 230 may be hinged to fold upwardly, along the dotted lines, to overlay the top surfaces of the table tops 220, 222. In another embodiment, the sections 224, 226, 228, 230 may be hinged to fold downwardly, beneath the surfaces of the table tops 220, 222. In still another embodiment, the edges of the table tops may include pockets so that the sections 224, 226, 228, 230 may slide into the interiors of the table tops 220, 222.

To create the conference table 210, an insert or leaf 236 may be positioned between the ends of the table tops 220, 222, as in the prior embodiment. Once the insert or leaf 236 is put into place, the conference table 210 becomes a continuous table extending from the starboard side 38 to the port side 40 of the fuselage 10.

FIG. 8 illustrates a fourth contemplated embodiment of the conference table 212 of the present invention. In this embodiment, a first table top 238 is supported by a first pedestal leg 240. A second table top 242 is supported by a second pedestal leg 244. A first slidable table top 246 overlies the first table top 238. A second slidable table top overlies the second table top 242. The first slidable table tops 246 may be moved in the direction of the arrows 250. Similarly, the second slidable table top 248 may be moved in the direction of the arrows 252.

As should be apparent from FIG. 8, the first and second slidable table tops 246, 248 initially are positioned against the interior sides of the fuselage 10. They are then slid into the center of the fuselage 10 to meet one another along the seam 254. Once the table tops 246, 248 meet at the seam 254, they present a continuous conference table 212 that extends the breadth of the fuselage 10.

It is noted, for purposes of clarity, that the conference tables 104, 208, 210, 212 need not extend entirely from one side of the fuselage 10 to the other to practice the present invention.

Renewed reference is now made to FIG. 5. As noted above, the seats 18, 62 are affixed to tracks 24 in the floor 14 in one contemplated embodiment of the present invention. So that the seats 18, 62 may be repositioned within the transitional region within the fuselage 10, the seats 18, 62 are supported on seat frames 118. A top view of the seat frames 118 for both of the seats 18, 62 is provided in FIG. 5. A front view of the seat frame 118 is provided in FIG. 9.

As shown in FIGS. 5 and 9, in this embodiment, the seat frame 118 is supported by the legs 22 of the seats 18, 62. Two laterally-spaced supports 120, 122 extend in the starboard-port direction of the fuselage 10 and connect the legs 22 of the seats 18, 62. The supports 120, 122 slidably engage the bottoms of the seats 18, 62, thereby permitting the seats 18, 62 to slide laterally into the passageway 32.

Figure 10:
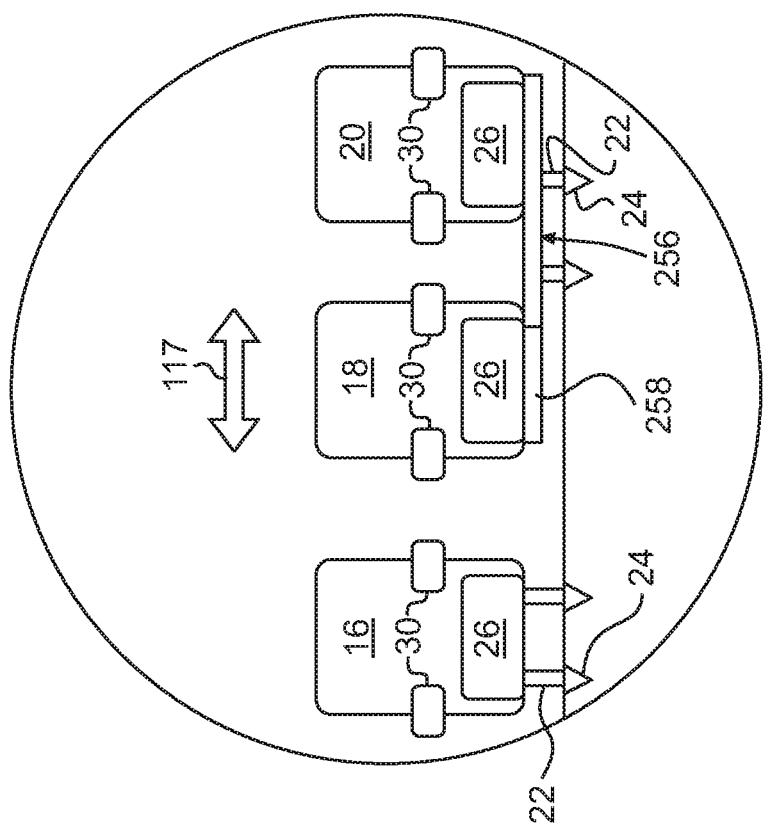
FIG. 10 is a cross-sectional view of the fuselage of the aircraft of the present invention, showing a second configuration for the seats that are movable in a lateral direction of the fuselage.

FIG. 10 provides a front elevational view of a second contemplated embodiment of the seat frame 256 of the present invention. Here, the seat frame 256 includes a slidable section 258 that supports the seat 18. The slidable section 258 permits the seat 18 to slide from its initial position in the direction of the arrows 117, as shown in FIG. 10.

As noted above, it is possible that the seats 16, 18, 20, 60, 62, 64 may be adjustable within the tracks 24. If so, the seat frames 118, 256 cooperate with the adjustment mechanisms associated with the tracks 14 to provide additional options for adjustability.

As should be apparent, there are a great number of ways in which the seats 18, 62 may be constructed to permit the seats 18, 62 to be shifted laterally within the fuselage 10. The embodiment illustrated is meant to be exemplary of those many different embodiments.

While the seats 18, 62 are described as being adjustable in their lateral positions within the fuselage 10, the remaining seats 16, 20, 60, 64 also may be adjustable. It is contemplated that the seats 16, 18, 20, 60, 62, 64 may be adjustable in fore-aft directions, in port and starboard directions, and rotationally. Among other things, adjustment of the seats 16, 18, 20, 60, 62, 64 permits the passengers to move closer to the conference table 104, as required or desired.

If the seats 16, 18, 20, 60, 62, 64 are movable as discussed above, it is contemplated that the seats 16, 18, 20, 60, 62, 64 will include means to lock the seats in one or more selected position. It is anticipated that, once a position is selected, the passenger may wish to secure the seat 16, 18, 20, 60, 62, 64 in the selected position. Any number of locking mechanisms may be employed, as should be understood to those skilled in the art.

As noted above, it is contemplated that one or more of the seats 16, 18, 20, 60, 62, 64 may be rotated within their respective positions to face directions other than the fore and aft directions of the fuselage 10. For example, the seat 16 and the seat 18 may be rotated to face one another across the passageway 32. Additionally, the seat 76 may be rotated to face the bed 86. Still further configurations are possible, which illustrates further configurations for the transitional region 102 within the second compartment 44, as well as other compartments within the fuselage 10.

Figure 11:
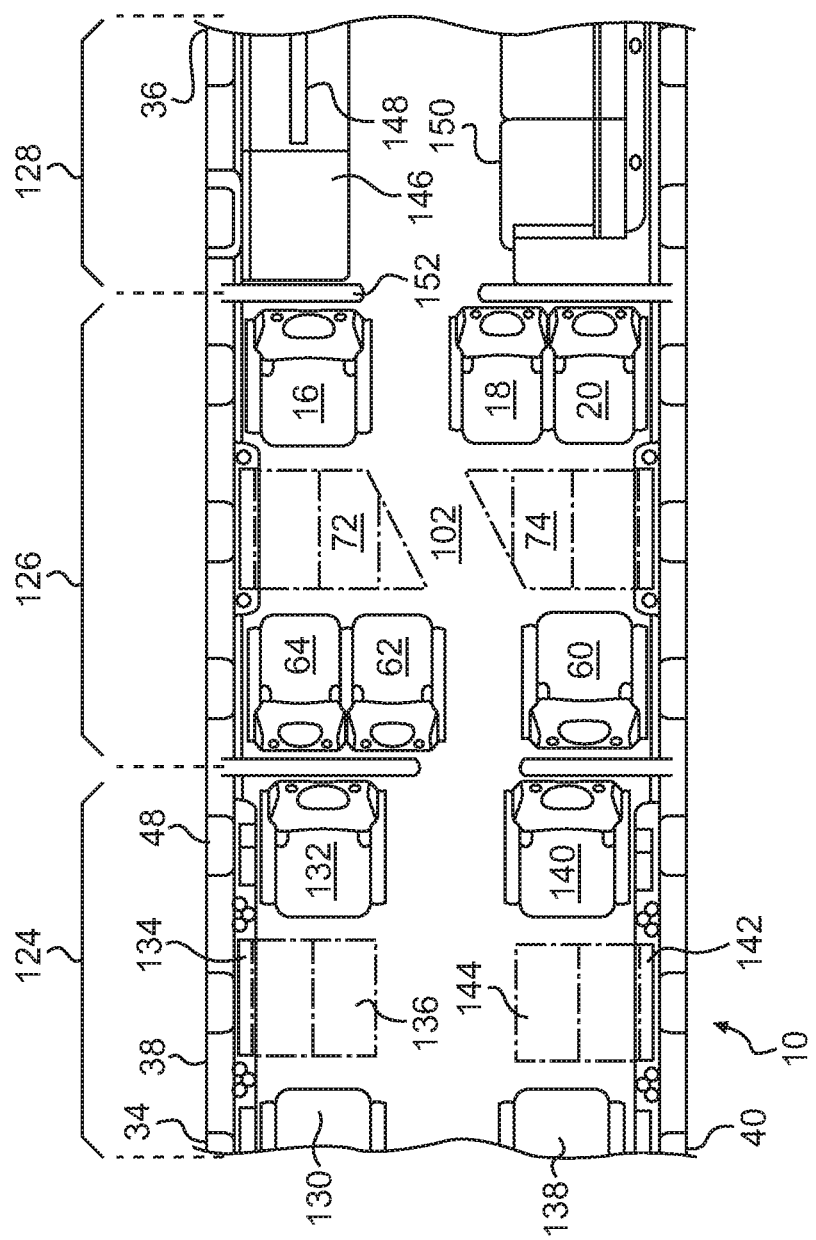
FIG. 11 is a top plan view of a fourth embodiment of a configuration for an aircraft interior that is contemplated by the present invention.

FIG. 11 provides a top plan view of a further embodiment of the present invention. In this embodiment, the fuselage 10 is divided into three compartments 124, 126, 128, as in the prior embodiment. As in the prior embodiment, the front (or fore) section 34 of the fuselage 10 is at the left-hand side of the illustration. The rear (or aft) section 36 of the fuselage 10 is at the right-hand side of the drawing. As a result, the right-hand (or starboard) side 38 is at the top of the drawing, while the left-hand (or port) side 40 of the fuselage 10 is at the bottom of the drawing. As in the prior embodiment, this orientation may be reversed without departing from the scope of the present invention.

The center compartment 126 is intended to be the same as the compartment 44, which is discussed above. The compartment 126, therefore, includes some or all of the transitional features discussed above. The front compartment 124 and the rear compartment 128 differ from the prior embodiments.

In the embodiment illustrated in FIG. 11, the front compartment 124 is configured to present two seating areas on either side of the central passageway 32. As a result, on the starboard side 38, there are two seats 130, 132 that face one another. A cabinet 134 is positioned between the seats 130, 132. A table top 136 may be stowed in the cabinet 134. On the port side 40 of the fuselage 10, two seats 138, 140 are positioned. A cabinet 142 with a stowable table top 144 is positioned between the seats 138, 140.

As illustrated in FIG. 11, the table tops 136, 144 differ from the table tops 72, 74 at least in that they do not present angled ends that are configured to run adjacent to a transitional region within the fuselage 10. As illustrated, the table tops 136, 144 are intended to be provided at either coffee table or meeting table heights. However, the table tops 136, 144 are intended to be accessible by the seats 130, 132, 138, 140 immediately adjacent thereto. It is noted, therefore, that the cabinets 134, 142 differ from the cabinets 68, 70, at least in so far as they stow tables 136, 144 of a different type than tables 72, 74.

With continued reference to FIG. 11, it is noted that the seats 130, 132, 138, 140 may be configured to slide laterally as discussed in connection with seats 20, 62 above. In addition, one or more of the seats 130, 132, 138, 140 may be configured to rotate and face the center of the first compartment 124 or the passageway through the compartment 124. The construction of the first compartment 124, therefore, presents yet another reconfigurable transitional area within the fuselage 10, consistent with the parameters of the present invention.

It is contemplated that a conference table may be established in the first compartment 124. If so, the conference table could be configured in any of the manners discussed above.

In FIG. 11, the third compartment 128 includes a cabinet 146 with a television 148 on the starboard side 38. A couch 150 is disposed on the port side 40 of the fuselage 10.

As should be apparent, the first compartment 124 does not have a separating bulkhead. In this embodiment, a bulkhead 152 separates only the second compartment 126 from the third compartment 128.

Figure 12:
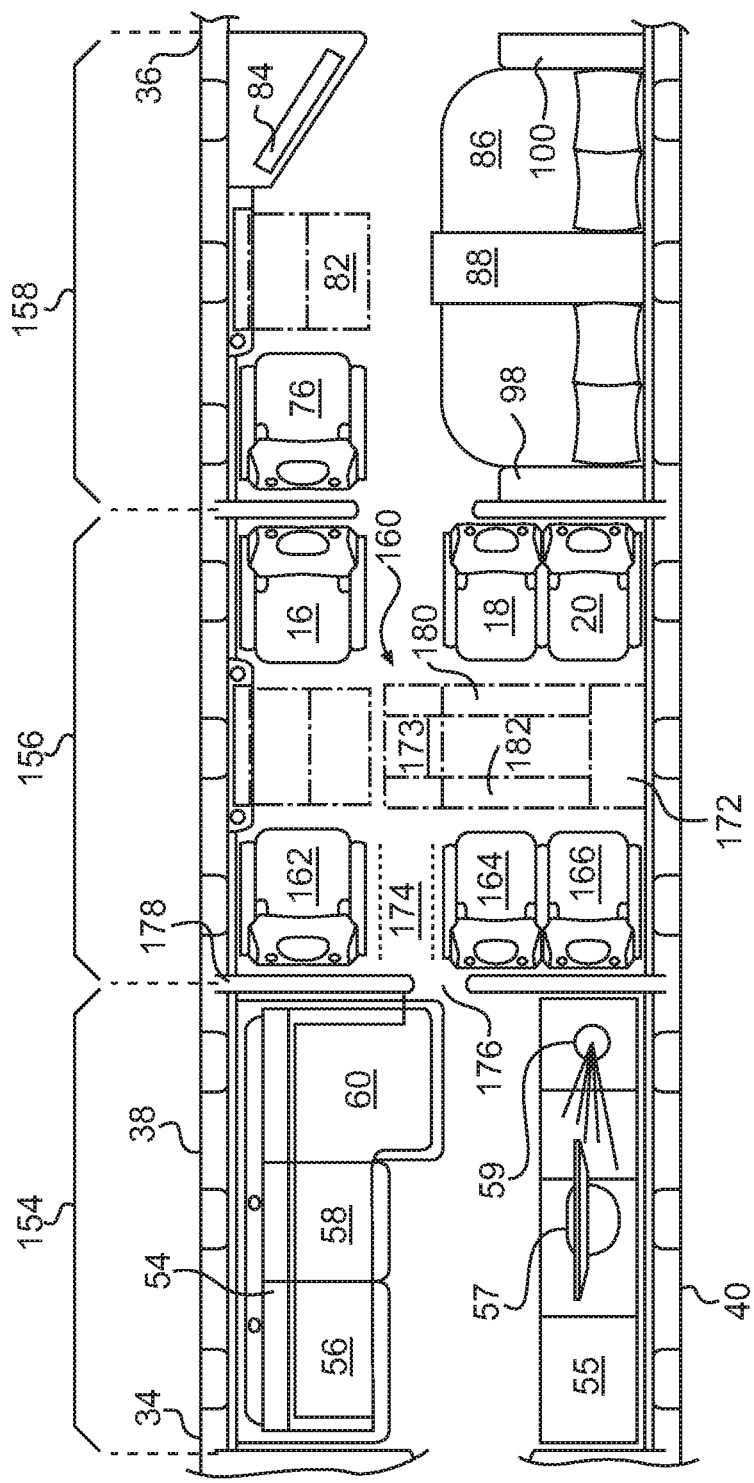
FIG. 12 is top plan view of an aircraft interior where the second compartment incorporates a seating arrangement showing limits of prior art straight-aisle configurations.

FIG. 12 is a top plan view of a fuselage 10 that is divided into a first compartment 154, a second compartment 156, and a third compartment 158. The first compartment 154 is intended to be the same as the first compartment 42 described in connection with FIGS. 3-5. The third compartment 158 is intended to be the same as the third compartment 46. Accordingly, the same reference numerals are used for the fixtures depicted therein.

As is apparent from FIG. 12, the second compartment 156 differs from the second compartment 44.

In this embodiment, the second compartment 156 presents a configuration for a traditional space 160. In other words, the second compartment 156 is configured as would be expected by those familiar with the prior art in a configuration known to those in the art. In this traditional configuration, the seats 16, 18, 20 are opposed by seats 162, 164, 166.

In this embodiment, the seat 16 sits opposite to the seat 162. A cabinet 168 is disposed between the seats 16, 162. The cabinet 168 stows a retractable table top 170.

On the port side 40 of the fuselage 10, the seats 18, 20 are positioned opposite to the seats 164, 166. Here, a stowable table 172 extends from the port side 40 of the fuselage 10. The stowable table 172 may be folded in any fashion as permits the stowage and deployment thereof, as should be appreciated by those skilled in the art.

It is noted that, in the embodiment illustrated in FIG. 12, the passageway 32 does not extend diagonally through any transitional area 102. Instead, the passageway 174 extends longitudinally through the second compartment 156. The passageway 174 extends to a doorway 176 in the bulkhead 178.

In the embodiment illustrated in FIG. 12, the tables 170, 172 are shown with a separation therebetween. An extensible section 173 may be added to the table top 172, as indicated.

With respect to the table top 172, two outwardly-folding leaves 180, 182 are provided. These leaves 180, 182 must be folded onto the top of the table top 172, and the entire table lowered to provide extra room and acceptable head clearance for Taxi, Take-off and Landing, for example, to permit a passenger to get up from one of the seats 18, 20, 164, 166 and transit to another section of the fuselage 10, for example.

FIG. 12 illustrates at least one deficiency in prior art seating configurations that fail to include a transitional region 102, such as that provided by the present invention. In FIG. 12, it is apparent that the doorway 176 provides an inadequate space for easy passage of persons from the first compartment 154 to the second compartment 156. As a result, the configuration of the first compartment 154 is incompatible (at least partially) with the configuration of the traditional, second compartment 156. This emphasizes at least one of the limitations presented by the prior art.

It should be apparent, therefore, that the creation of a transitional region, such as the transitional region 102, greatly expands the possible interior configurations for an aircraft beyond those that are possible using the traditional approach to aircraft interior design.

Figure 13:
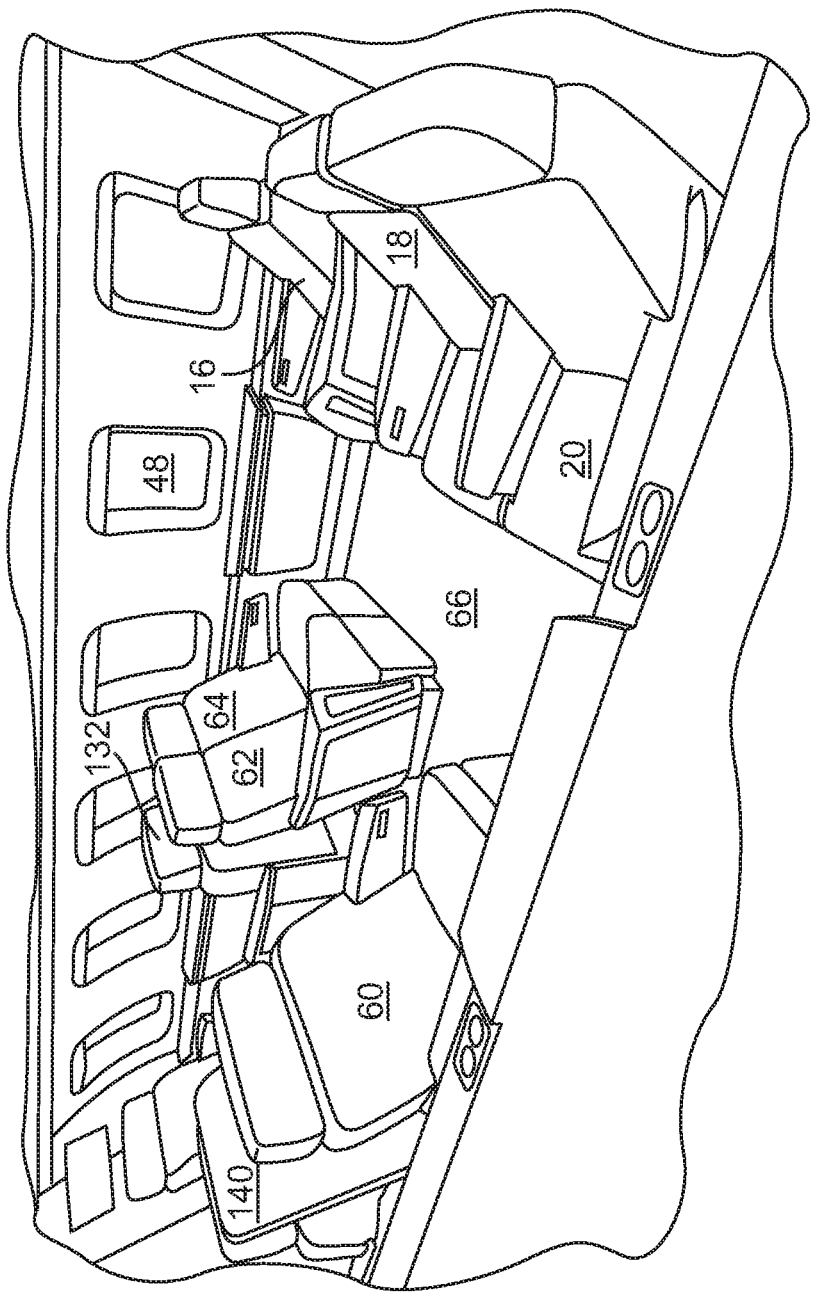
FIG. 13 is a perspective view of the first and second compartments according to the present invention, which compartments are depicted in FIG. 11, with tables in a stowed condition.

FIG. 13 is a perspective illustration of the embodiment of the interior configuration that is illustrated in FIG. 11. Here, the table tops 72, 74 are shown in the stowed condition. As a result, the center area 66 is in an open configuration, representing one aspect of the transitional nature of this space.

Figure 14:
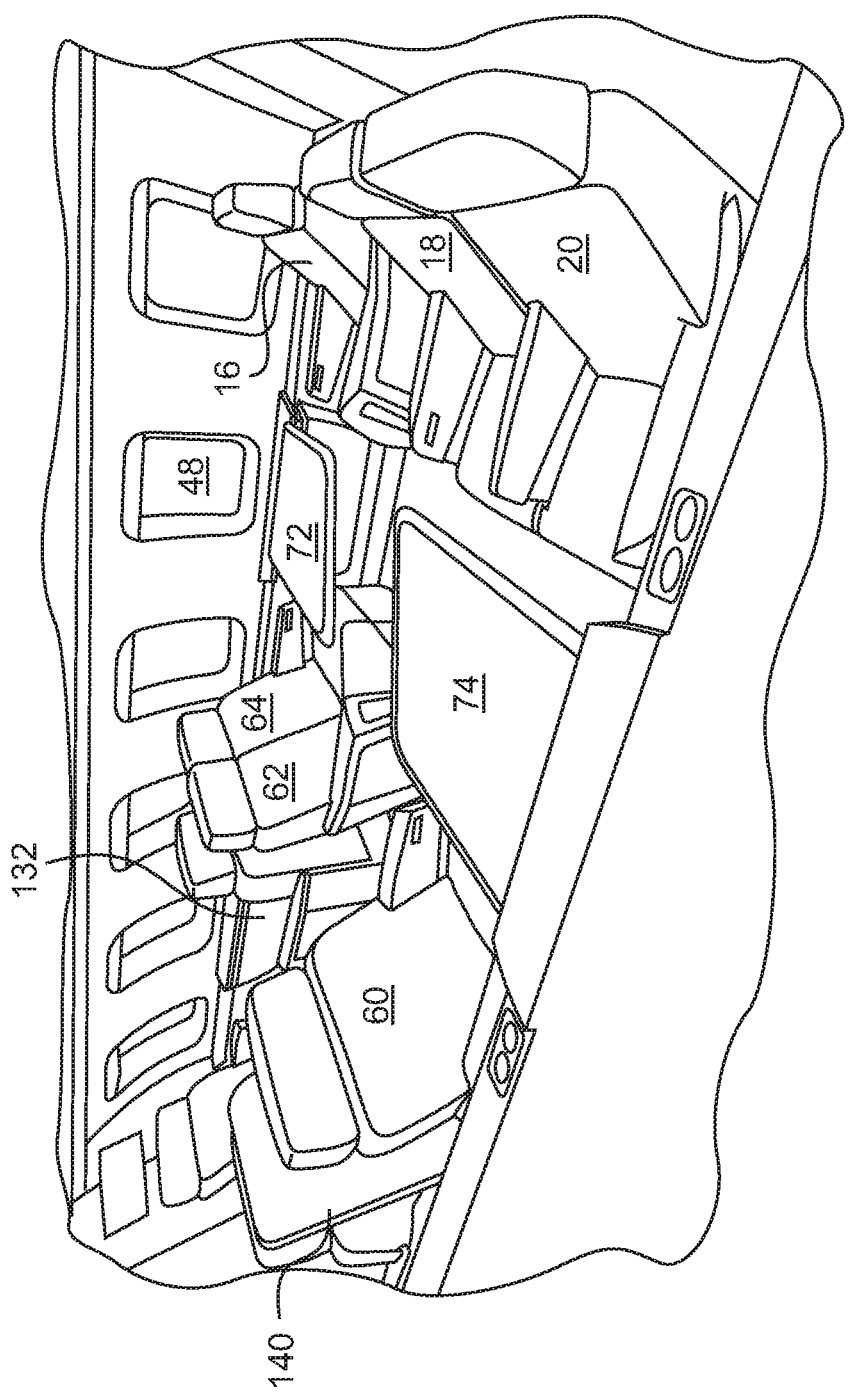
FIG. 14 is a perspective illustration of the configuration shown in FIGS. 4 and 11, with tables shown in a deployed condition.

FIG. 14 provides another perspective view of the interior configuration of FIG. 11. Here, the table tops 72, 74 are in the deployed condition, illustrating another aspect of the transitional nature of this interior aircraft space.

Figure 15:
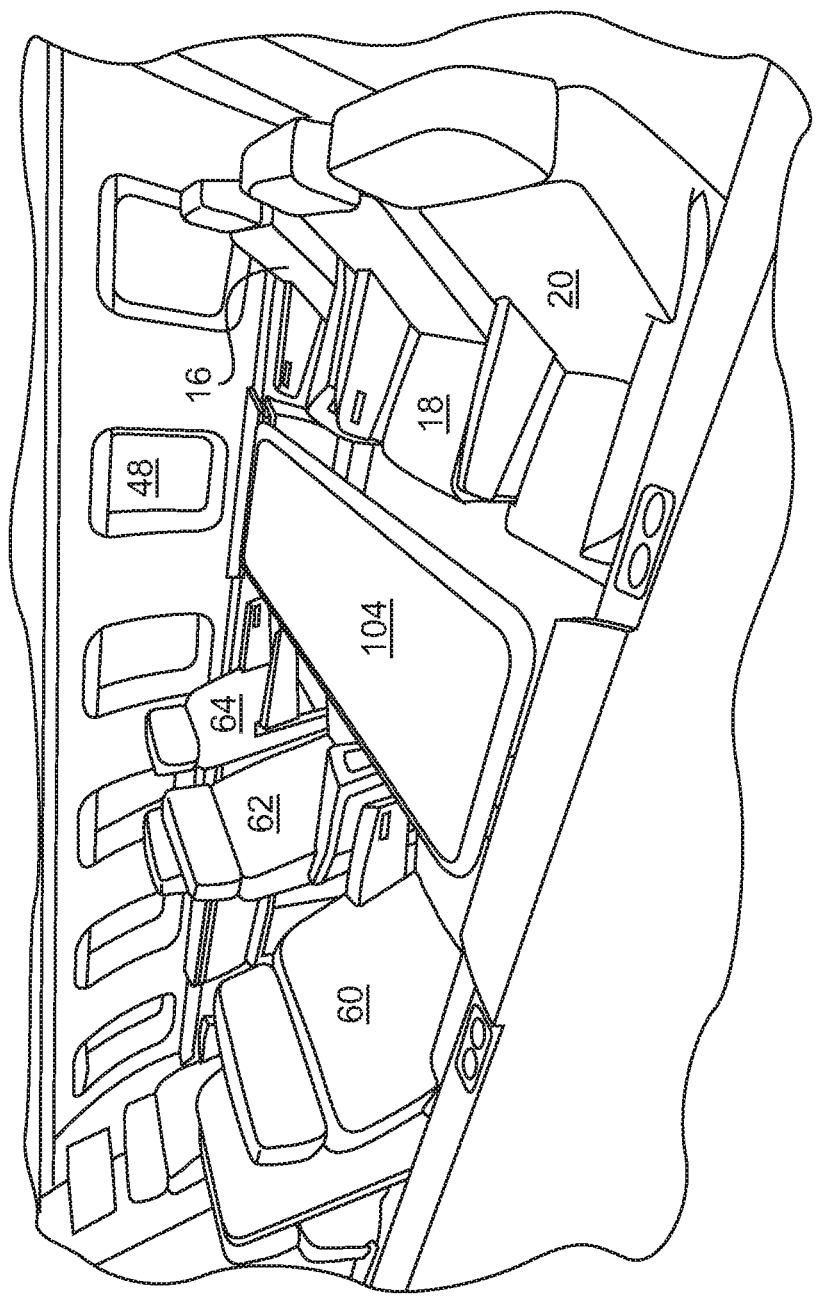
FIG. 15 is a perspective view of the seats in the transitional area, where the seats are arranged in the second configuration and the conference table is deployed, as shown in FIG. 5.

FIG. 15 provides a perspective view of the interior configuration of FIG. 11. However, in this illustration the conference table 104 (illustrated in FIG. 5) is shown in the deployed condition, extending from the port side 40 to the starboard side 38 of the fuselage 10. Further, as illustrated in FIG. 5, the seats 18, 62 are shifted into the passageway 32 to permit a more comfortable arrangement of the seats 16, 18, 20, 60, 62, 64 around the conference table 104. This drawing, therefore, presents a further aspect of the transitional nature of the interior space within the fuselage 10.

Figure 16:
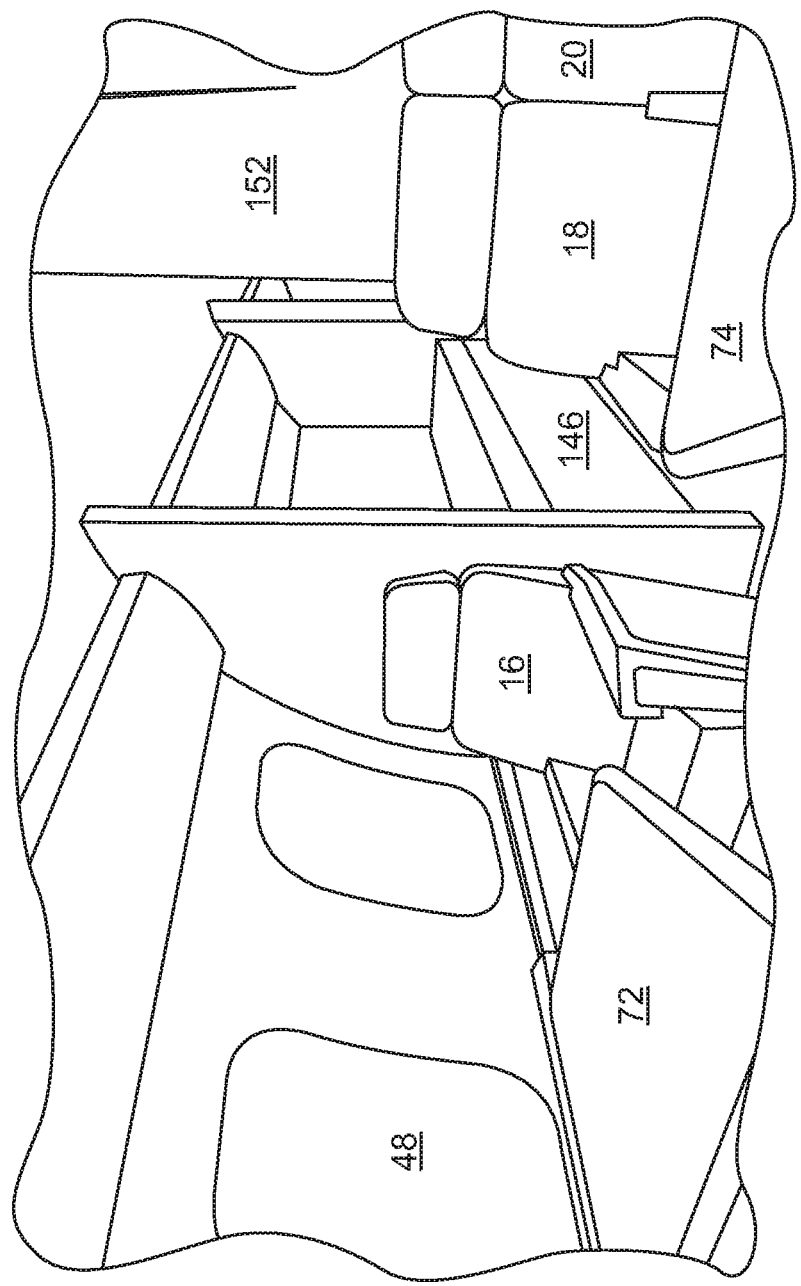
FIG. 16 is a perspective view of the seats in the transitional area, where the seats are arranged in the first configuration consistent with the arrangement illustrated in FIG. 4 and where the tables are shown in a deployed condition.

FIG. 16 provides a perspective illustration of the interior configuration illustrated in FIG. 14. Here, the interior space is shown from a slightly different angle for illustrative purposes.

Figure 17:
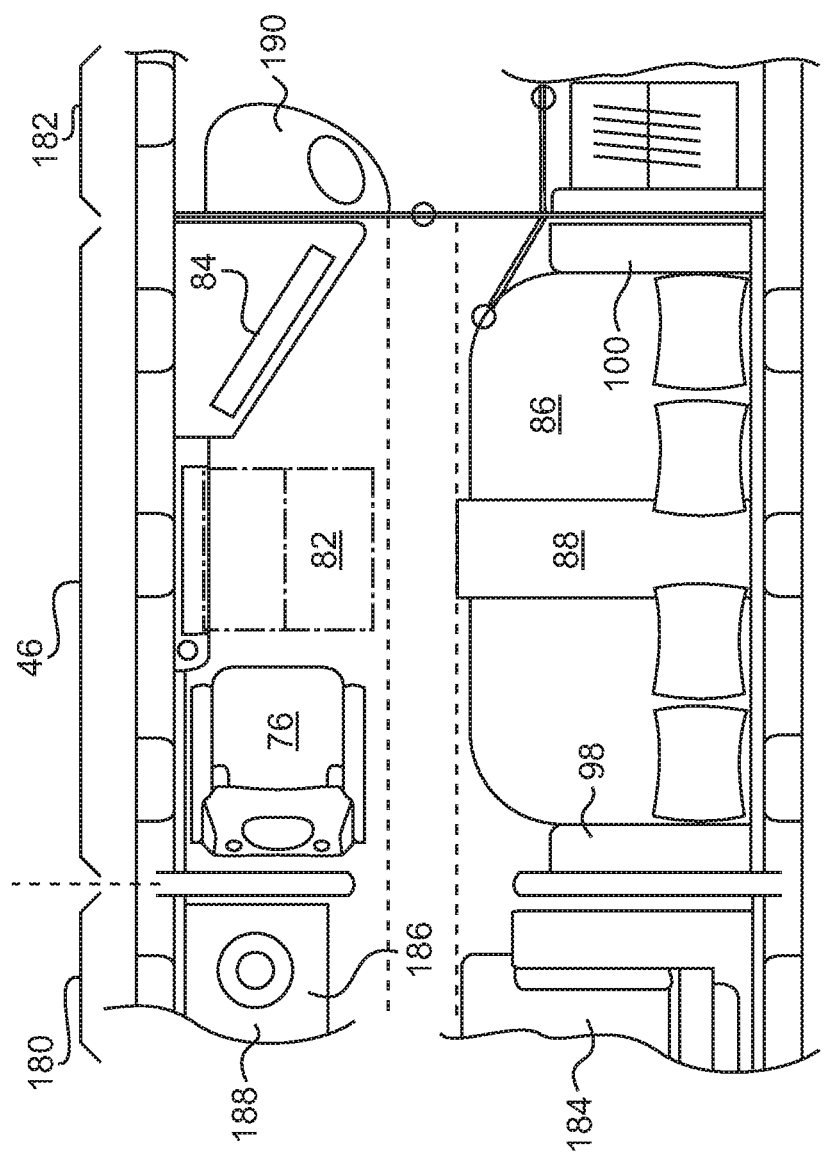
FIG. 17 is a top plan view of a fifth embodiment of a configuration for an aircraft interior that is contemplated by the present invention.

FIG. 17 is an enlarged view of the third compartment 46 that is shown in FIG. 3, for example. Portions of a first compartment 180 and a third compartment 182 also are shown.

Here, the first compartment 180 is configured as a living space, such as the one illustrated in FIG. 11. A portion of a couch 184 and a cabinet 186 with a lamp 188 are shown for context. The third compartment 182 is a bathroom area. A sink 190 is visible in this illustration.

Figure 18:
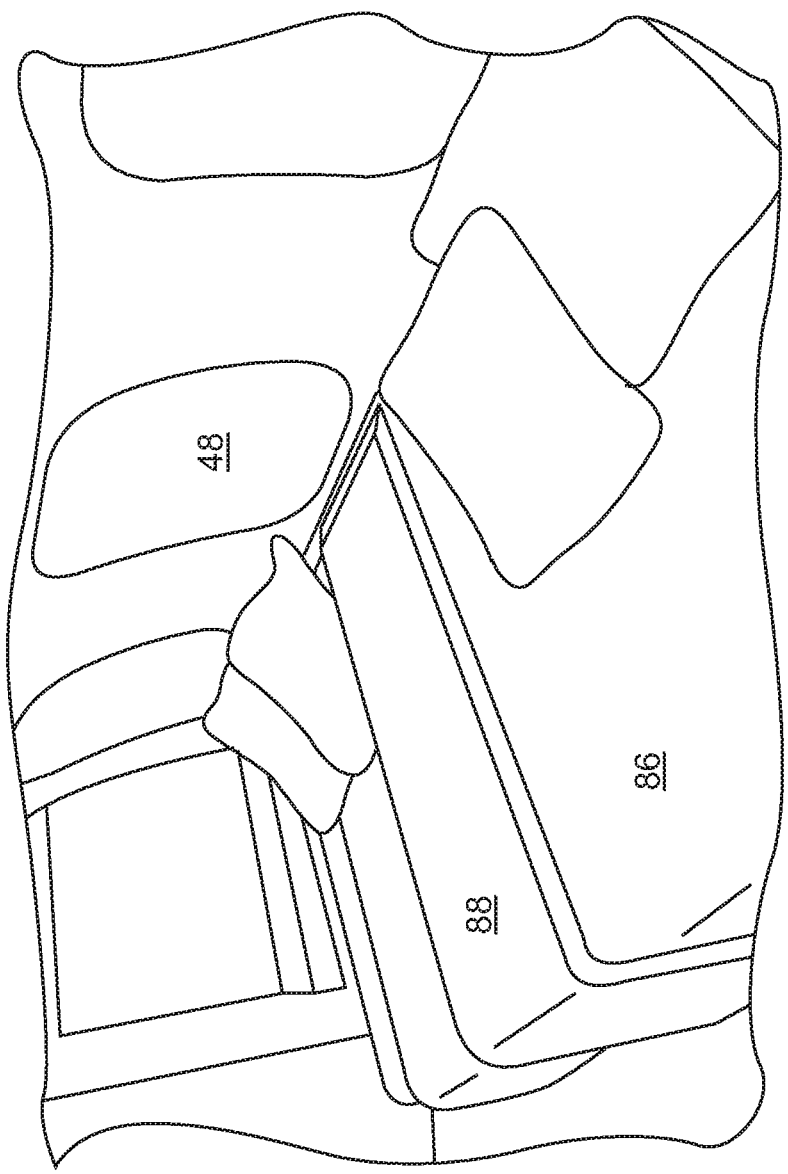
FIG. 18 is a perspective illustration of the interior configuration illustrated in FIG. 17.

FIG. 18 is a perspective illustration of the third compartment 46 shown in FIG. 17. Here, the bed 86 and table 88 are presented for clarification of the prior illustrations.

Figure 19:
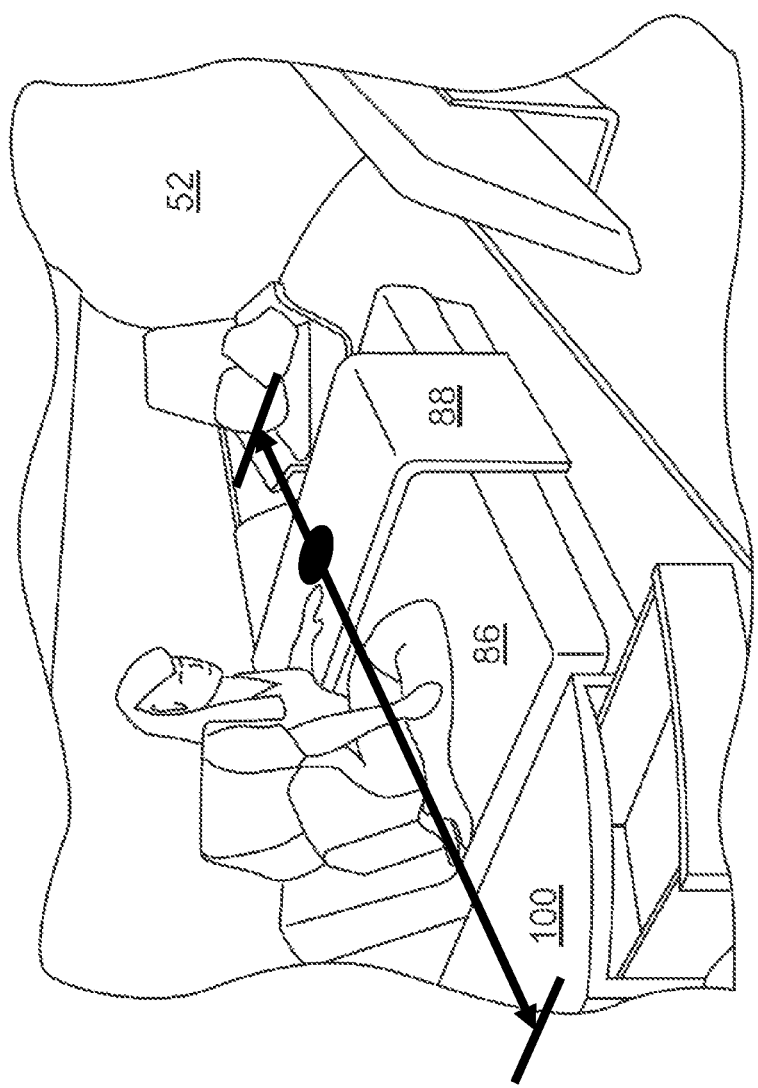
FIG. 19 is an alternative arrangement of the interior configuration illustrated in FIG. 17.

FIG. 19 provides yet one further perspective illustration of the third compartment 46 that is illustrated in FIG. 17. The night stand and/or storage cabinet 100 is visible in this illustration. The movable table 88 is positioned in relation to the bed so that the movable table 88 is movable along fore and aft directions of the fuselage and is positionable over at least a portion of the bed. The movable table 88 also is movable over the at least one cabinet 100 so that the movable table 88 does not extend over any portion of the bed.

With respect to the embodiments described herein it is noted that the various definitions of the various compartments is not meant to be limiting of the present invention. For example, in FIG. 11, the first and second compartments 124, 126 may be considered a single compartment, simply because there is no bulkhead that separates the two seating areas from one another.

Figure 20:
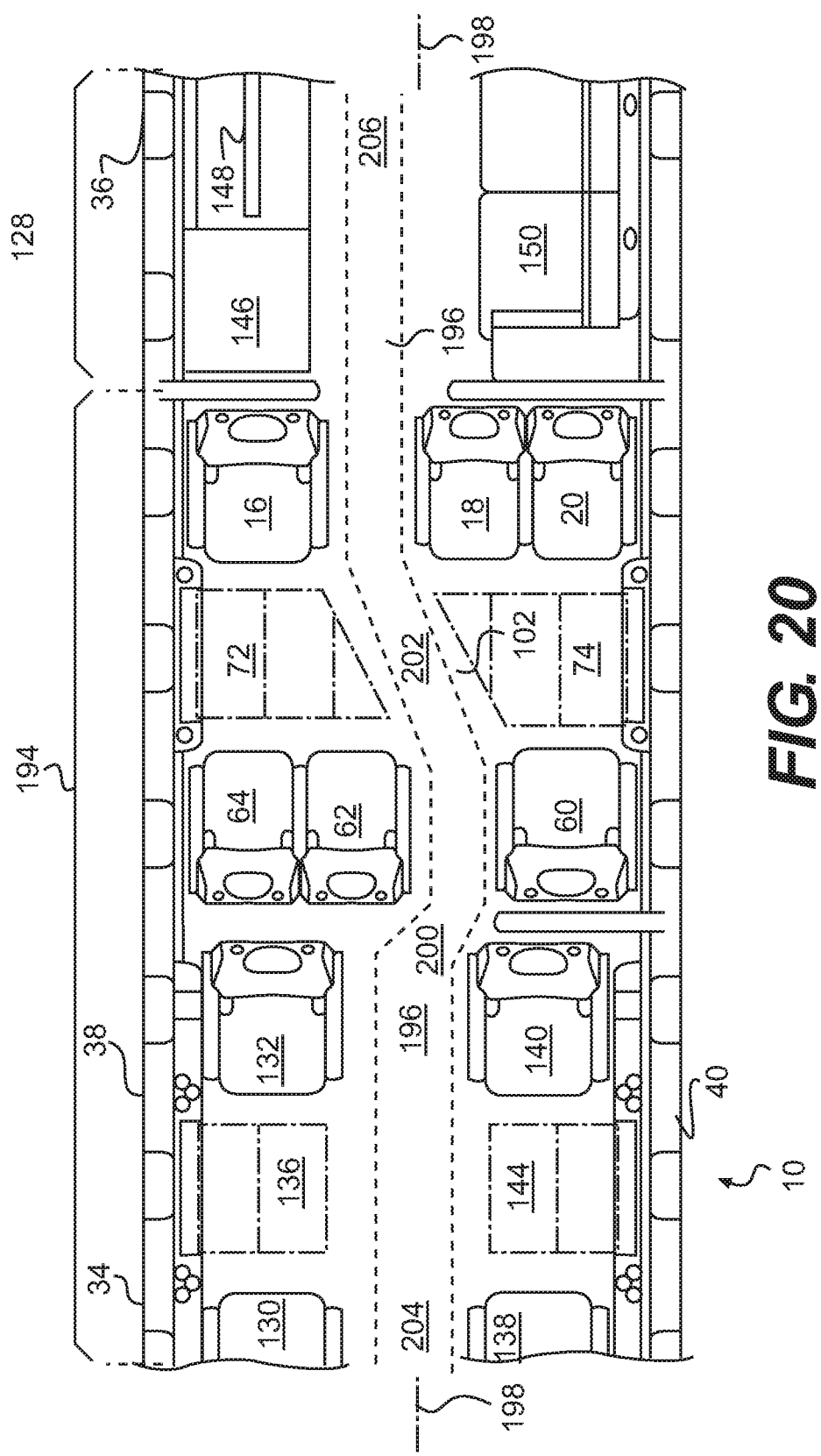
FIG. 20 is a top plan view that provides additional details concerning the embodiment illustrated in FIG. 11.

FIG. 20 provides a duplicate of the top plan view illustrated in FIG. 11. Here, however, the compartments have been redefined. Specifically, the first and second compartments 124, 126 in FIG. 11 have been combined to define a single compartment 194. The remaining compartment 128 remains the same as illustrated in FIG. 11.

Additionally, FIG. 20, like FIG. 11, shows the configuration of a passageway 196 that meanders from the fore section 34 of the fuselage 10 to the aft section 36. As illustrated, the passageway 196 extends along the first longitudinal axis 198 of the fuselage 10, makes a first transition 200 at a point adjacent to the seats 60, 62, 64, makes a second transition 202 in the transitional space 102, and then proceeds to the aft section 36 of the fuselage along the second longitudinal axis 198. As is apparent, the passageway (which may be referred alternatively to as a walkway or aisle by lay persons) has a first section 204 at the fore section 34 of the fuselage and a second portion 206 at the aft section 36 of the fuselage 10. The first and second portions 204, 206 of the passageway 196 are offset laterally from one another. In this embodiment, two transitional regions 200, 202 connect the first and second sections 204, 206 of the passageway to one another.

With respect to FIG. 3, it is noted that there is a single transition, in the transitional region 102, that connects the first and second sections of the passageway 32 to one another.

As noted above, a change in the position of the passageway 32 or the passageway 196 is one aspect of the transitional space 102 of the present invention, among others. With respect to FIG. 20, the transitional space encompasses the compartment 194 and presents at least two transitional regions. As should be apparent to those skilled in the art, a larger number of transitional spaces maybe incorporated into the fuselage 10, as required or desired.

As noted above, the transitional region 102 extends perpendicularly to the longitudinal axis 198 of the fuselage 10. In the embodiments presented, the transitional region extends between the sides of the fuselage 10. It should be apparent, however, that this is not required to practice the present invention. It is contemplated for a large aircraft that a transitional space might extend only a portion of the distance from one side of the aircraft to the other. It is noted that the transitional space extends laterally across the passageway 32 or the passageway 196. In other words, the transitional space 102 is not disposed at only one side of the passageway 32 or passageway 196.

In connection with the present invention, it is noted that the transitional region 102 provides a visual separation between two sections of the aircraft. This stands in contrast to the prior art where all sections of the aircraft are visible from a single passageway that extends along a single longitudinal axis within the fuselage 10. This visual separation defines at least one further aspect associated with the transitional region 102 of the present invention.

Additionally, as should be apparent to those skilled in the art, the arrangement of the seats 16, 18, 20, 60, 62, 64 helps to define the transitional passageway 102, 202 within the fuselage 10. As discussed above, the transitional passageway 102, 202 connects the longitudinally passageway 32 that is displaced along the first and second longitudinal axes 33, 35. Again, this departure from the prior art presents design possibilities that were not possible when following the traditional approach with a single passageway extending along a single longitudinal axis. Therefore, the seating arrangement presents yet another aspect of the transitional region 102 within the fuselage 10.

So as not to preclude application of the present invention to aircraft with larger fuselages, the present invention contemplates that a larger number of seats may be disposed around a transitional region, such as the region 102.

Figure 21:
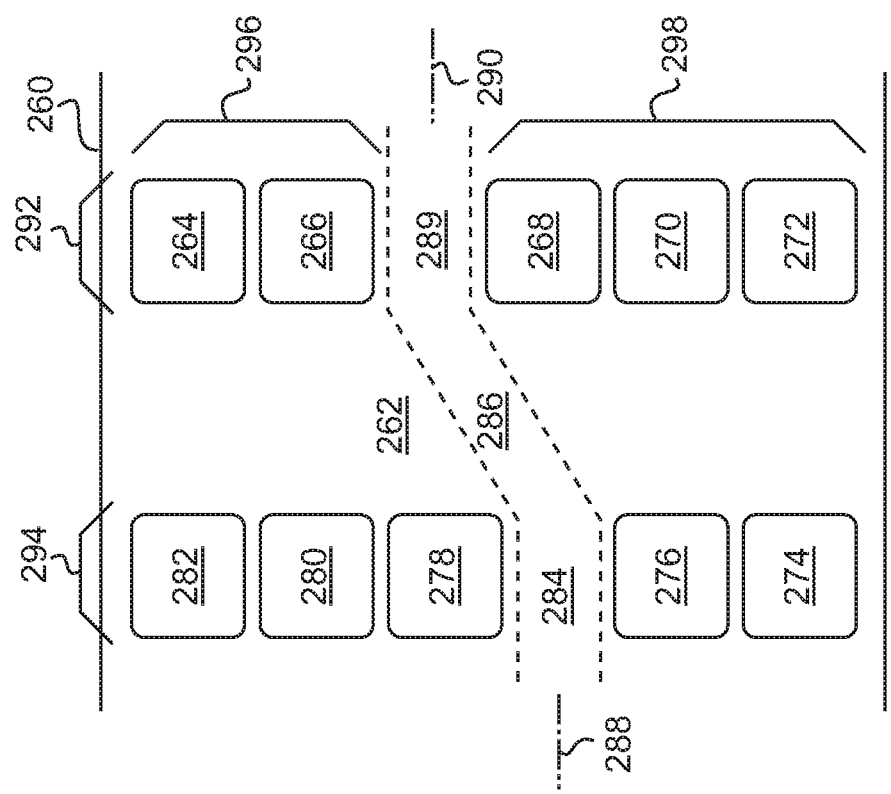
FIG. 21 is a top plan view of a further embodiment of the transitional region of the present invention.

FIG. 21 provides a top plan view of another contemplated configuration for an aircraft fuselage 260 according to the present invention. In FIG. 21, a transitional region 262 is illustrated that contains ten seats 264, 266, 268, 270, 272, 274, 276, 278, 280, 282. The seats 264-282 are contemplated to have the same construction as the seats 16, 18, 20, 60, 62, 64 discussed above. One or more of the seats are adjustable laterally, as discussed above. While not illustrated, a conference table may be deployed or positioned within the transitional region 262 in the same manner(s) as discussed above.

It is noted that the passageway 284 includes a transitional passageway portion 286 that connects the longitudinally-oriented portions at either end of the transitional region 262. As before, the passageway 284 transitions from a location along a first longitudinal axis 288 to a second longitudinal axis 290.

With respect to the embodiment illustrated in FIG. 21, it is contemplated that the seats 264-282 are arranged such that the seats in the first bank 292 face the seats in the second bank 294. With reference to the first bank of seats 292, there are fewer seats on one side of the passageway 284 than on the other side of the passageway 284. In other words, one aspect of the transitional region 262 of the present invention is to provide unequal seating on opposite sides of the passageway 284. As illustrated in FIG. 21, the first bank of seats 292 includes a first subset 296 of two seats disposed on a first side of the fuselage 260. The first bank of seats 292 also includes a second subset 298 of three seats disposed on a second side of the passageway 284. The second bank of seats 294 presents a complimentary configuration, as shown.

For purposes of FIG. 21, the number of seats in the first subset 296 is smaller than the number of seats in the second subset 298. As should be apparent from the foregoing, one aspect of the present invention is to provide subsets 296, 298 of seats that are unequal in number, with one subset 296 including a fewer number of seats than the other subset 298.

In still larger aircraft, a larger number of seats may be disposed within the transitional region within the fuselage. So that a transitional region may be established, it is contemplated that a larger number of seats will be positioned on one side of the passageway than the other. In other words, the subsets of seats will contain unequal numbers of seats consistent with the discussion presented herein.

Within the present specification, there may be explicit or implicit references to aspects of safety. It is noted that any comments or implications with respect to safety are merely for purposes of the present discussion. As should be apparent to those skilled in the art, any furniture and/or components that are incorporated into the interior space of an aircraft are subjected to various regulations worldwide. As a result, any suggestion, whether explicit or otherwise, should not be taken as an indication that any component of an aircraft, whether currently produced or not, is more or less safe than any other component.

As indicated above, the present invention is not intended to be limited solely to the embodiments described and/or illustrated herein. To the contrary, there are numerous variations and equivalents that should be apparent to those skilled in the art based upon the embodiment described and/or illustrated herein. Those variations and equivalents are intended to be encompassed by the present invention.

What is claimed is:

1. An interior configuration for an aircraft, comprising:
   a bed disposed on a floor of a cabin within the aircraft, wherein the bed has a top end for a person's head, a bottom end for a person's feet, and two lateral sides oriented with fore and aft directions of the fuselage, and wherein at least one of the top end or the bottom end abuts against one side of a fuselage of the aircraft;
   at least one cabinet positioned adjacent to one of the two lateral sides;

a ledge disposed on the one side of the fuselage; and a movable table positioned in relation to the bed and slidably connected to the ledge so that the movable table is movable along the fore and aft directions of the fuselage and is positionable over at least a portion of the bed, wherein the movable table also is movable over the at least one cabinet so that the movable table does not extend over any portion of the bed.

2. The interior configuration of claim 1, wherein the movable table is slidably disposed within the aircraft cabin to extend over the bed.

3. The interior configuration of claim 1, wherein the movable table is supported, at a first end, by the ledge.

4. The interior configuration of claim 3, wherein the movable table is supported at a second end by the floor.

5. The interior configuration of claim 4, wherein the movable table comprises at least one leg and a table top disposed atop the at least one leg.

\* \* \* \* \*